US012761693B2

(12) United States Patent
Rundle et al.

(10) Patent No.: US 12,761,693 B2
(45) Date of Patent: Oct. 13, 2026

(54) PROTECTIVE TRIMS FOR ELECTRONIC DEVICES

(71) Applicant: Apple Inc., Cupertino, CA (US)

(72) Inventors: Nicholas A. Rundle, San Jose, CA (US); Lauren M. Farrell, Saratoga, CA (US); Gregory D. Carini, San Jose, CA (US); Anton Talalayev, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/781,864

(22) Filed: Jul. 23, 2024

(65) Prior Publication Data

US 2025/0036163 A1 Jan. 30, 2025

Related U.S. Application Data

(60) Provisional application No. 63/528,601, filed on Jul. 24, 2023.

(51) Int. Cl.
*G06F 1/16* (2006.01)

(52) U.S. Cl.
CPC .......... *G06F 1/1637* (2013.01); *G06F 1/1662* (2013.01); *G06F 1/1681* (2013.01); *G06F 1/1686* (2013.01)

(58) Field of Classification Search
CPC .... G06F 1/1613; G06F 1/1616; G06F 1/1637; G06F 1/1662; G06F 1/1681; G06F 1/1686
See application file for complete search history.

(56) References Cited

U.S. PATENT DOCUMENTS 4,106,839 A 8/1978 Cooper
4,256,412 A 3/1981 Tybus et al.
(Continued)

FOREIGN PATENT DOCUMENTS

CN 101087500 12/2007
CN 101350849 1/2009
(Continued)

OTHER PUBLICATIONS

Author Unknown, "Improved Touchscreen Products," Research Disclosure, Kenneth Mason Publications, Hampshire, UK, GB, vol. 428, No. 53, Dec. 1, 1999.
(Continued)

*Primary Examiner* — Michael Pervan
(74) *Attorney, Agent, or Firm* — Brownstein Hyatt Farber Schreck, LLP

(57) ABSTRACT

A laptop computer may include a base portion having a keyboard and a display portion flexibly coupled to the base portion and positionable in an open configuration relative to the base portion and in a closed configuration relative to the base portion. The display portion may include a display stack, a display cover positioned over the display stack and may define a peripheral side surface and an exterior surface. A housing may define a side exterior surface of the display portion and may extend at least partially around a periphery of the display cover, and a trim member. The trim member may be positioned between the display cover and the housing. The trim member may be bonded to a peripheral side surface of the display cover and define a protruding portion.

21 Claims, 25 Drawing Sheets

(56) References Cited

U.S. PATENT DOCUMENTS 4,855,174 A 8/1989 Kamamoto et al.
4,989,622 A 2/1991 Kozuka et al.
5,055,347 A 10/1991 Bacon, Jr.
5,394,306 A 2/1995 Koenck et al.
5,512,374 A 4/1996 Wallace et al.
6,061,104 A 5/2000 Evanicky et al.
6,093,887 A 7/2000 Ponto et al.
6,189,938 B1 2/2001 Nakadaira et al.
6,278,873 B1 8/2001 Itakura et al.
6,288,330 B1 9/2001 Chen
6,327,376 B1 12/2001 Hasrkin et al.
6,359,768 B1 3/2002 Eversley et al.
6,392,873 B1 5/2002 Honda
6,424,338 B1 7/2002 Anderson et al.
6,442,826 B1 9/2002 Staudt et al.
6,473,069 B1 10/2002 Gerpheide
6,483,024 B1 11/2002 Smithson et al.
6,589,891 B1 7/2003 Rast
6,654,256 B2 11/2003 Gough
6,671,160 B2 12/2003 Hayden
6,747,713 B1 6/2004 Sato et al.
6,849,992 B2 2/2005 Kim et al.
6,940,731 B2 9/2005 Davis et al.
6,996,425 B2 2/2006 Watanabe
7,048,242 B2 5/2006 Oddsen, Jr.
7,061,177 B2 6/2006 Kang et al.
7,113,237 B2 9/2006 Nitto et al.
7,436,653 B2 10/2008 Yang et al.
7,491,900 B1 2/2009 Peets et al.
7,586,753 B2 9/2009 Lu
7,604,377 B2 10/2009 Yu et al.
7,755,913 B2 7/2010 He
7,829,812 B2 11/2010 Tolbert et al.
7,920,904 B2 4/2011 Kim et al.
7,986,525 B2 7/2011 Wang
8,066,233 B2 11/2011 Fujikawa et al.
8,092,897 B2 1/2012 Honma et al.
8,101,859 B2 1/2012 Zadesky
8,164,898 B2 4/2012 Lin et al.
D660,193 S 5/2012 Neuner
8,178,793 B2 5/2012 Morimoto et al.
8,195,244 B2 6/2012 Smoyer et al.
8,199,488 B2 6/2012 Zou et al.
8,358,513 B2 1/2013 Kim et al.
8,396,521 B2 3/2013 Horimoto et al.
8,456,847 B2 6/2013 Hwang et al.
8,489,162 B1 7/2013 Dou et al.
8,509,863 B2 8/2013 Vedurmudi et al.
8,553,907 B2 10/2013 Thomason et al.
8,558,977 B2 10/2013 Gettemy et al.
8,587,935 B2 11/2013 Lee
8,654,524 B2 2/2014 Pance et al.
8,665,236 B2 3/2014 Myers
8,675,359 B2 3/2014 Chen
8,681,115 B2 3/2014 Kurita
8,744,529 B2 6/2014 Freund et al.
8,773,606 B2 * 7/2014 Ling .................... G06F 1/1616
349/149
8,773,848 B2 7/2014 Russell-Clarke et al.
8,824,140 B2 9/2014 Prest et al.
8,974,924 B2 3/2015 Weber et al.
8,975,540 B2 3/2015 Mareno et al.
9,007,748 B2 4/2015 Jarvis
9,075,567 B2 * 7/2015 Mathew ................ G06F 1/1616
9,086,748 B2 7/2015 Nam et al.
9,124,676 B2 9/2015 Allore et al.
9,135,944 B2 9/2015 Jenks
9,162,519 B2 10/2015 Suehiro et al.
9,173,306 B2 10/2015 Lim et al.
9,192,072 B2 11/2015 Shin et al.
9,203,463 B2 12/2015 Asrani et al.
9,218,116 B2 12/2015 Benko et al.
9,250,659 B2 2/2016 Tsai et al.
9,390,869 B2 7/2016 Lee et al.
9,429,997 B2 8/2016 Myers et al.
9,448,631 B2 9/2016 Winter et al.
9,489,054 B1 11/2016 Sumsion et al.
9,532,723 B2 1/2017 Kim et al.
9,545,764 B2 1/2017 Allore et al.
9,550,335 B2 1/2017 Cole et al.
9,616,625 B2 4/2017 Allore et al.
9,621,218 B1 4/2017 Glickman et al.
9,642,241 B2 5/2017 Huitema et al.
9,654,164 B2 5/2017 Irci et al.
9,693,473 B2 6/2017 Hibino et al.
9,740,237 B2 8/2017 Moore et al.
9,768,506 B2 9/2017 Krogerus et al.
9,804,635 B2 10/2017 Kim et al.
9,826,649 B2 11/2017 Narajowski et al.
9,898,903 B2 2/2018 Khoshkava et al.
9,905,909 B2 2/2018 Liou et al.
9,939,784 B1 4/2018 Berardinelli et al.
9,955,603 B2 4/2018 Kiple et al.
9,974,199 B2 5/2018 Allore et al.
9,977,467 B2 5/2018 Garelli et al.
10,012,550 B2 7/2018 Yang et al.
10,013,075 B2 7/2018 Shipman
10,042,442 B2 8/2018 Kwak
10,110,267 B2 10/2018 Kim et al.
10,234,909 B2 3/2019 Youm et al.
10,321,590 B2 6/2019 Cater et al.
10,355,059 B2 7/2019 Lee et al.
10,424,765 B2 9/2019 Hwang et al.
10,446,911 B2 10/2019 Karilainen et al.
10,447,325 B2 10/2019 Jiang et al.
10,468,753 B2 11/2019 Kim et al.
10,587,032 B2 3/2020 Lee et al.
10,656,714 B2 5/2020 Ligtenberg et al.
10,665,925 B2 5/2020 Liu et al.
10,700,145 B2 6/2020 Lee et al.
10,705,570 B2 7/2020 Kuna et al.
10,819,011 B2 10/2020 Lee et al.
10,871,828 B2 12/2020 Ligtenberg et al.
10,915,151 B2 2/2021 Silvanto et al.
10,983,570 B1 4/2021 Files et al.
11,099,649 B2 8/2021 Ligtenberg et al.
11,133,572 B2 9/2021 Zhang et al.
11,175,769 B2 11/2021 Prest et al.
11,189,909 B2 11/2021 Leutheuser et al.
11,258,163 B2 2/2022 Froese et al.
11,366,523 B2 6/2022 Ligtenberg et al.
11,379,010 B2 7/2022 Kuna et al.
11,550,369 B2 1/2023 Silvanto et al.
11,678,445 B2 6/2023 Prest et al.
11,720,149 B2 8/2023 Kuna et al.
11,720,176 B2 8/2023 Ligtenberg et al.
11,812,842 B2 11/2023 Perkins et al.
12,067,177 B2 8/2024 Zhang
12,147,605 B2 11/2024 Ligtenberg et al.
12,449,851 B2 10/2025 Li et al.
2002/0006687 A1 1/2002 Lam
2002/0072335 A1 6/2002 Watanabe
2002/0080298 A1 6/2002 Fukayama et al.
2002/0130981 A1 9/2002 Ma et al.
2003/0102789 A1 6/2003 Kim et al.
2004/0036396 A1 2/2004 Kang et al.
2004/0190239 A1 9/2004 Weng
2005/0140565 A1 6/2005 Krombach
2006/0034043 A1 2/2006 Hisano et al.
2006/0203124 A1 9/2006 Park et al.
2007/0195495 A1 8/2007 Kim et al.
2007/0229702 A1 10/2007 Shirono et al.
2007/0287512 A1 12/2007 Kilpi et al.
2008/0018475 A1 1/2008 Breed et al.
2008/0084384 A1 4/2008 Gregorio et al.
2008/0165138 A1 7/2008 Li
2008/0174037 A1 7/2008 Chen
2008/0309640 A1 12/2008 Hong et al.
2009/0003141 A1 1/2009 Ozawa et al.
2009/0021529 A1 1/2009 Wendler et al.
2009/0041984 A1 2/2009 Mayers et al.
2009/0219156 A1 9/2009 August et al.
2009/0278688 A1 11/2009 Tuttle
2009/0295943 A1 12/2009 Kim et al.

(56) References Cited

U.S. PATENT DOCUMENTS

| | | | |
|---|---|---|---|
| 2009/0296325 | A1 | 12/2009 | Morimoto et al. |
| 2009/0298547 | A1 | 12/2009 | Kim et al. |
| 2010/0026656 | A1 | 2/2010 | Hotelling et al. |
| 2010/0061044 | A1 | 3/2010 | Zou et al. |
| 2010/0091442 | A1 | 4/2010 | Theobald et al. |
| 2010/0105452 | A1 | 4/2010 | Shin et al. |
| 2010/0137043 | A1 | 6/2010 | Horimoto et al. |
| 2010/0151925 | A1 | 6/2010 | Vedurmudi et al. |
| 2010/0157515 | A1 | 6/2010 | Tseng et al. |
| 2010/0265182 | A1 | 10/2010 | Ball et al. |
| 2010/0302016 | A1 | 12/2010 | Zaborowski et al. |
| 2010/0308998 | A1 | 12/2010 | Hesch, Jr. et al. |
| 2010/0315399 | A1 | 12/2010 | Davis et al. |
| 2011/0038114 | A1 | 2/2011 | Pance et al. |
| 2011/0047459 | A1 | 2/2011 | Van Der Westhuizen |
| 2011/0065479 | A1 | 3/2011 | Nader |
| 2011/0091051 | A1 | 4/2011 | Thomason et al. |
| 2011/0095994 | A1 | 4/2011 | Birnbaum |
| 2011/0141673 | A1 | 6/2011 | Takakusaki et al. |
| 2011/0205169 | A1 | 8/2011 | Yasutake et al. |
| 2011/0292579 | A1 | 12/2011 | Koga |
| 2011/0317401 | A1* | 12/2011 | Ling .................... G06F 1/1616 361/728 |
| 2012/0009983 | A1 | 1/2012 | Mow et al. |
| 2012/0049000 | A1 | 3/2012 | Kajita et al. |
| 2012/0069517 | A1 | 3/2012 | Prest et al. |
| 2012/0088072 | A1 | 4/2012 | Pawloski et al. |
| 2012/0094594 | A1 | 4/2012 | Rofougaran et al. |
| 2012/0097412 | A1 | 4/2012 | Wennemer et al. |
| 2012/0175165 | A1 | 7/2012 | Merz et al. |
| 2012/0212424 | A1 | 8/2012 | Sharma et al. |
| 2012/0236477 | A1 | 9/2012 | Weber |
| 2012/0268412 | A1 | 10/2012 | Cruz-Hernandez et al. |
| 2012/0274575 | A1 | 11/2012 | Solomon et al. |
| 2012/0327008 | A1 | 12/2012 | Kurita |
| 2013/0051000 | A1 | 2/2013 | Yu et al. |
| 2013/0076649 | A1 | 3/2013 | Myers et al. |
| 2013/0162515 | A1 | 6/2013 | Prociw et al. |
| 2013/0169490 | A1 | 7/2013 | Pascolini et al. |
| 2013/0188366 | A1 | 7/2013 | Russell-Clarke et al. |
| 2013/0207855 | A1 | 8/2013 | Chien et al. |
| 2013/0273295 | A1 | 10/2013 | Kenney et al. |
| 2013/0308282 | A1 | 11/2013 | Shin et al. |
| 2014/0015773 | A1 | 1/2014 | Loeffler |
| 2014/0031093 | A1 | 1/2014 | Song et al. |
| 2014/0078008 | A1 | 3/2014 | Kang et al. |
| 2014/0125528 | A1 | 5/2014 | Tsai et al. |
| 2014/0139450 | A1 | 5/2014 | Levesque et al. |
| 2014/0239781 | A1 | 8/2014 | Allore et al. |
| 2014/0240615 | A1 | 8/2014 | Allore et al. |
| 2014/0240856 | A1 | 8/2014 | Allore et al. |
| 2014/0240911 | A1 | 8/2014 | Cole et al. |
| 2014/0253487 | A1 | 9/2014 | Bezinge et al. |
| 2014/0265822 | A1 | 9/2014 | Drzaic et al. |
| 2014/0274231 | A1 | 9/2014 | De Luis et al. |
| 2014/0288438 | A1 | 9/2014 | Venkatraman et al. |
| 2014/0298478 | A1 | 10/2014 | Kim et al. |
| 2014/0311767 | A1 | 10/2014 | Merz et al. |
| 2014/0320344 | A1 | 10/2014 | Sanderovich et al. |
| 2014/0320435 | A1 | 10/2014 | Modarres et al. |
| 2014/0327584 | A1 | 11/2014 | Chang et al. |
| 2014/0347799 | A1 | 11/2014 | Ono et al. |
| 2014/0368455 | A1 | 12/2014 | Croisonnier et al. |
| 2015/0001104 | A1 | 1/2015 | Kim et al. |
| 2015/0062419 | A1 | 3/2015 | Hooton et al. |
| 2015/0090571 | A1 | 4/2015 | Leong et al. |
| 2015/0092329 | A1 | 4/2015 | Balasundaram et al. |
| 2015/0109223 | A1 | 4/2015 | Kessler et al. |
| 2015/0124401 | A1 | 5/2015 | Prest et al. |
| 2015/0171916 | A1 | 6/2015 | Asrani et al. |
| 2015/0183185 | A1 | 7/2015 | Chang |
| 2015/0185946 | A1 | 7/2015 | Fourie |
| 2015/0255853 | A1 | 9/2015 | Kwong et al. |
| 2015/0364820 | A1 | 12/2015 | Dong et al. |
| 2016/0029899 | A1 | 2/2016 | Kim et al. |
| 2016/0034042 | A1 | 2/2016 | Joo et al. |
| 2016/0048163 | A1 | 2/2016 | Degner et al. |
| 2016/0055729 | A1 | 2/2016 | Maddox et al. |
| 2016/0056527 | A1 | 2/2016 | Pascolini et al. |
| 2016/0058375 | A1 | 3/2016 | Rothkopf et al. |
| 2016/0064820 | A1 | 3/2016 | Kim et al. |
| 2016/0098016 | A1 | 4/2016 | Ely et al. |
| 2016/0098107 | A1 | 4/2016 | Morrell et al. |
| 2016/0103544 | A1 | 4/2016 | Filiz et al. |
| 2016/0124532 | A1 | 5/2016 | Wolff et al. |
| 2016/0147257 | A1 | 5/2016 | Yamazaki |
| 2016/0212839 | A1 | 7/2016 | Choi et al. |
| 2016/0218441 | A1 | 7/2016 | Tian et al. |
| 2016/0248147 | A1 | 8/2016 | Zhang et al. |
| 2016/0252888 | A1 | 9/2016 | Kim et al. |
| 2016/0254587 | A1 | 9/2016 | Jung et al. |
| 2016/0255944 | A1 | 9/2016 | Baranski et al. |
| 2016/0270247 | A1 | 9/2016 | Jones et al. |
| 2016/0285153 | A1 | 9/2016 | Li et al. |
| 2016/0308563 | A1 | 10/2016 | Ouyang et al. |
| 2016/0316574 | A1 | 10/2016 | Chang et al. |
| 2016/0322700 | A1 | 11/2016 | Choon et al. |
| 2016/0327980 | A1 | 11/2016 | Farahani et al. |
| 2016/0327986 | A1 | 11/2016 | Farahani et al. |
| 2016/0329625 | A1 | 11/2016 | Lin et al. |
| 2016/0336643 | A1 | 11/2016 | Pascolini et al. |
| 2016/0349989 | A1 | 12/2016 | Yu et al. |
| 2017/0010771 | A1 | 1/2017 | Bernstein et al. |
| 2017/0038793 | A1 | 2/2017 | Kallman |
| 2017/0045916 | A1 | 2/2017 | Kim et al. |
| 2017/0048495 | A1 | 2/2017 | Scalisi et al. |
| 2017/0060201 | A1 | 3/2017 | Prather et al. |
| 2017/0075305 | A1 | 3/2017 | Ryu et al. |
| 2017/0093021 | A1 | 3/2017 | Kim et al. |
| 2017/0094804 | A1 | 3/2017 | Brodsky et al. |
| 2017/0094821 | A1 | 3/2017 | Allore et al. |
| 2017/0104261 | A1 | 4/2017 | Wong et al. |
| 2017/0229760 | A1 | 8/2017 | Karilainen et al. |
| 2017/0230073 | A1 | 8/2017 | Youn et al. |
| 2017/0264008 | A1 | 9/2017 | Ying et al. |
| 2017/0264722 | A1 | 9/2017 | Zhong |
| 2017/0303048 | A1 | 10/2017 | Hooton et al. |
| 2017/0324150 | A1 | 11/2017 | Liu et al. |
| 2017/0331196 | A1 | 11/2017 | Wang et al. |
| 2018/0006361 | A1 | 1/2018 | Mai et al. |
| 2018/0020208 | A1 | 1/2018 | Woo et al. |
| 2018/0026341 | A1 | 1/2018 | Mow et al. |
| 2018/0026353 | A1 | 1/2018 | Tseng et al. |
| 2018/0041238 | A1 | 2/2018 | Jiang et al. |
| 2018/0070465 | A1 | 3/2018 | Cater et al. |
| 2018/0077328 | A1 | 3/2018 | Park et al. |
| 2018/0083344 | A1 | 3/2018 | Han et al. |
| 2018/0090847 | A1 | 3/2018 | Romano et al. |
| 2018/0098448 | A1 | 4/2018 | Baek et al. |
| 2018/0115052 | A1 | 4/2018 | Mai et al. |
| 2018/0120985 | A1 | 5/2018 | Wallace et al. |
| 2018/0198212 | A1 | 7/2018 | Rodriguez |
| 2018/0210515 | A1 | 7/2018 | Lyles et al. |
| 2018/0261921 | A1 | 9/2018 | Ha et al. |
| 2018/0284845 | A1 | 10/2018 | Honma et al. |
| 2018/0286924 | A1 | 10/2018 | Lee et al. |
| 2018/0287245 | A1 | 10/2018 | Hsu et al. |
| 2018/0301787 | A1 | 10/2018 | Han et al. |
| 2019/0020365 | A1 | 1/2019 | Ouyang et al. |
| 2019/0079583 | A1 | 3/2019 | Alghooneh et al. |
| 2019/0083715 | A1 | 3/2019 | Redmond et al. |
| 2019/0090806 | A1 | 3/2019 | Clavelle et al. |
| 2019/0103682 | A1 | 4/2019 | Thai et al. |
| 2019/0128669 | A1 | 5/2019 | Nobayashi et al. |
| 2019/0129473 | A1 | 5/2019 | Hu et al. |
| 2019/0131696 | A1 | 5/2019 | Hanshew et al. |
| 2019/0196411 | A1 | 6/2019 | Yuen |
| 2019/0215794 | A1 | 7/2019 | Sayem et al. |
| 2019/0259819 | A1 | 8/2019 | Lee et al. |
| 2019/0312334 | A1 | 10/2019 | Shin et al. |
| 2019/0361543 | A1 | 11/2019 | Zhang |
| 2019/0377385 | A1 | 12/2019 | Bushnell et al. |
| 2019/0391539 | A1 | 12/2019 | Perkins et al. |
| 2020/0012912 | A1 | 1/2020 | Klimt et al. |

(56) References Cited

U.S. PATENT DOCUMENTS

| | | | |
|---|---|---|---|
| 2020/0037602 | A1 | 2/2020 | Hicks et al. |
| 2020/0058992 | A1 | 2/2020 | Wu et al. |
| 2020/0064779 | A1 | 2/2020 | Pandya et al. |
| 2020/0073439 | A1 | 3/2020 | Amano et al. |
| 2020/0073445 | A1 | 3/2020 | Kuna et al. |
| 2020/0174653 | A1 | 6/2020 | Klein et al. |
| 2020/0233462 | A1* | 7/2020 | Ohishi .................. G06F 1/1681 |
| 2020/0314567 | A1 | 10/2020 | Shriner et al. |
| 2020/0328499 | A1 | 10/2020 | O'Driscoll et al. |
| 2020/0409023 | A1 | 12/2020 | Kazuo et al. |
| 2021/0168230 | A1 | 6/2021 | Baker et al. |
| 2021/0234403 | A1 | 7/2021 | Ku et al. |
| 2021/0353226 | A1 | 11/2021 | Hiemstra et al. |
| 2022/0043293 | A1 | 2/2022 | Umejima et al. |
| 2022/0057885 | A1 | 2/2022 | Prest et al. |
| 2022/0059928 | A1 | 2/2022 | Leutheuser et al. |
| 2022/0094059 | A1 | 3/2022 | Wang et al. |
| 2022/0214724 | A1* | 7/2022 | Hendren ............... G06F 1/1686 |
| 2022/0326777 | A1 | 10/2022 | Ligtenberg et al. |
| 2023/0006338 | A1 | 1/2023 | Liu et al. |
| 2023/0034118 | A1 | 2/2023 | Wolff et al. |
| 2023/0122975 | A1 | 4/2023 | Dhillon et al. |
| 2023/0161390 | A1 | 5/2023 | Silvanto et al. |
| 2023/0333600 | A1 | 10/2023 | Kuna et al. |
| 2023/0333658 | A1 | 10/2023 | Ligtenberg et al. |
| 2023/0384829 | A1 | 11/2023 | Li et al. |
| 2024/0094765 | A1 | 3/2024 | Leclerc et al. |
| 2024/0210993 | A1 | 6/2024 | Stacy et al. |
| 2024/0411389 | A1 | 12/2024 | Zhang |
| 2025/0013274 | A1 | 1/2025 | Silvanto et al. |
| 2025/0015484 | A1 | 1/2025 | Kuna et al. |
| 2025/0036163 | A1 | 1/2025 | Rundle et al. |
| 2025/0044874 | A1 | 2/2025 | Ligtenberg et al. |
| 2025/0099035 | A1 | 3/2025 | Hiemstra et al. |

FOREIGN PATENT DOCUMENTS

| | | | |
|---|---|---|---|
| CN | 101753655 | | 6/2010 |
| CN | 102159045 | | 8/2011 |
| CN | 102405453 | | 4/2012 |
| CN | 202281978 | | 6/2012 |
| CN | 202735925 | | 2/2013 |
| CN | 102984904 | | 3/2013 |
| CN | 103168280 | | 6/2013 |
| CN | 203054674 | | 7/2013 |
| CN | 103327758 | | 9/2013 |
| CN | 103390793 | | 11/2013 |
| CN | 103513702 | | 1/2014 |
| CN | 203416294 | | 1/2014 |
| CN | 103681061 | | 3/2014 |
| CN | 103777765 | | 5/2014 |
| CN | 104064865 | | 9/2014 |
| CN | 104427048 | | 3/2015 |
| CN | 204189070 | | 3/2015 |
| CN | 104582379 | | 4/2015 |
| CN | 104742308 | | 7/2015 |
| CN | 105006647 | | 10/2015 |
| CN | 105228966 | | 1/2016 |
| CN | 105703060 | | 6/2016 |
| CN | 105892568 | | 8/2016 |
| CN | 203674398 | | 12/2016 |
| CN | 106571516 | | 4/2017 |
| CN | 106785350 | | 5/2017 |
| CN | 107221506 | | 9/2017 |
| CN | 107275751 | | 10/2017 |
| CN | 107317121 | | 11/2017 |
| CN | 107534223 | | 1/2018 |
| CN | 107735903 | | 2/2018 |
| CN | 207216299 | | 4/2018 |
| CN | 108400425 | | 8/2018 |
| CN | 108594622 | | 9/2018 |
| CN | 108594623 | | 9/2018 |
| CN | 208385608 | | 1/2019 |
| CN | 109546295 | | 3/2019 |
| CN | 109980332 | | 7/2019 |
| CN | 110875974 | | 3/2020 |
| CN | 112532263 | | 3/2021 |
| CN | 112799294 | | 5/2021 |
| EP | 2565742 | | 3/2013 |
| EP | 2843501 | | 3/2015 |
| EP | 2993730 | | 3/2016 |
| EP | 3144768 | | 3/2017 |
| EP | 3438786 | | 2/2019 |
| EP | 3748464 | | 12/2020 |
| EP | 4024161 | | 7/2022 |
| EP | 4024161 | A1 * | 7/2022 ........... G06F 1/1652 |
| GB | 2516439 | | 1/2015 |
| GB | 2529885 | | 3/2016 |
| JP | S58151619 | | 9/1983 |
| JP | H61039144 | | 2/1986 |
| JP | H05022023 | | 1/1993 |
| JP | H09232849 | | 9/1997 |
| JP | H10102265 | | 4/1998 |
| JP | H63249697 | | 10/1998 |
| JP | 2001216077 | | 8/2001 |
| JP | 20023431 | F | 11/2002 |
| JP | 2004272690 | | 9/2004 |
| JP | 2006243812 | | 9/2006 |
| JP | 2007072375 | | 3/2007 |
| JP | 2011014149 | | 1/2011 |
| JP | 2011159276 | | 8/2011 |
| JP | 2011239139 | | 11/2011 |
| JP | 2011248888 | | 12/2011 |
| JP | 2011249126 | | 12/2011 |
| JP | 2012/019526 | | 1/2012 |
| JP | 2012027592 | | 2/2012 |
| JP | 2012222553 | | 11/2012 |
| JP | 2013508818 | | 3/2013 |
| JP | 2014501070 | | 1/2014 |
| JP | 2014078240 | | 5/2014 |
| JP | 2014086058 | | 5/2014 |
| JP | 2014512879 | | 5/2014 |
| JP | 2014153979 | | 8/2014 |
| JP | 2014186075 | | 10/2014 |
| JP | 2015031952 | | 2/2015 |
| JP | 2015532998 | | 11/2015 |
| JP | 2017157085 | | 9/2017 |
| JP | 2019537909 | | 12/2019 |
| KR | 20060125712 | | 12/2006 |
| KR | 20110049416 | | 5/2011 |
| KR | 20110076951 | | 7/2011 |
| KR | 20130065242 | | 6/2013 |
| KR | 20130096048 | | 8/2013 |
| KR | 20140017420 | | 2/2014 |
| KR | 20140113962 | | 9/2014 |
| KR | 20150012312 | | 2/2015 |
| KR | 20160019833 | | 2/2016 |
| KR | 20160052275 | | 5/2016 |
| KR | 20160001920 | | 6/2016 |
| KR | 20160121031 | | 10/2016 |
| KR | 20160134504 | | 11/2016 |
| KR | 20180025126 | | 3/2018 |
| KR | 20190118095 | | 10/2019 |
| KR | 20200027010 | | 3/2020 |
| TW | 201129285 | | 8/2011 |
| TW | 201532835 | | 9/2015 |
| TW | 201701119 | | 1/2017 |
| WO | WO00/14826 | | 3/2000 |
| WO | WO2009/002605 | | 12/2008 |
| WO | WO2009/033616 | | 3/2009 |
| WO | WO2009/049331 | | 4/2009 |
| WO | WO2009/129123 | | 10/2009 |
| WO | WO2011/130849 | | 10/2011 |
| WO | WO2012/006152 | | 1/2012 |
| WO | WO2012/129247 | | 9/2012 |
| WO | WO2012/177563 | | 12/2012 |
| WO | WO2014/037945 | | 3/2014 |
| WO | WO2014/149172 | | 9/2014 |
| WO | WO2014/182392 | | 11/2014 |
| WO | WO2015/153701 | | 10/2015 |
| WO | WO2016/039803 | | 3/2016 |
| WO | WO2016/053901 | | 4/2016 |
| WO | WO2016/082749 | | 6/2016 |
| WO | WO2016/168432 | | 10/2016 |

(56) References Cited

FOREIGN PATENT DOCUMENTS

| | | |
|---|---|---|
| WO | WO2018/013573 | 1/2018 |
| WO | WO2018/090295 | 5/2018 |
| WO | WO2018/142132 | 8/2018 |

OTHER PUBLICATIONS

Author Unknown, "Smart Watch—New Fashion Men/women Bluetooth Touch Screen Smart Watch Wrist Wrap Watch Phone," https://www.fargoshopping.co.ke/, 5 pages, Mar. 2016.

Kim et al., "Ultrathin Cross-Linked Perfluoropolyether Film Coatings from Liquid $CO_2$ and Subsequent UV Curing," Chem. Matter, vol. 22, pp. 2411-2413, 2010.

* cited by examiner

PROTECTIVE TRIMS FOR ELECTRONIC DEVICES

CROSS-REFERENCE TO RELATED APPLICATION(S)

This application is a nonprovisional patent application of and claims the benefit of U.S. Provisional Patent Application No. 63/528,601, filed Jul. 24, 2023 and titled "Protective Trims for Electronic Devices," the disclosure of which is hereby incorporated herein by reference in its entirety.

TECHNICAL FIELD

The subject matter of this application relates to portable electronic devices such as laptop computers and other foldable electronic devices. In particular, this application relates to protective trims for the display of these foldable electronic devices.

BACKGROUND

Modern consumer electronic devices take many shapes and forms, and have numerous uses and functions. Laptop computers, for example, are common types of computers that provide computing functions in a lightweight, portable form factor. Laptop computers may include input devices, such as keyboards and trackpads, and may have displays to produce graphical outputs.

SUMMARY

A laptop may include a base portion and a display portion. The base portion may include a keyboard. The display portion may flexibly couple to the base portion and may be positionable in an open configuration relative to the base portion and in a closed configuration relative to the base portion. The display portion may include a display stack and a display cover. The display cover may be positioned over the display stack and may define a peripheral side surface, an exterior surface, and an interior surface opposite the exterior surface. The display portion may also include a housing that defines at least a portion of a side exterior surface of the display portion and extending at least partially around a periphery of the display cover. The display portion may also have a trim member positioned between the display cover and the housing. The trim member may be bonded to the peripheral side surface of the display cover and may define a protruding portion configured to contact the base portion when the display portion is in the closed configuration relative to the base portion.

In some cases, the trim member may extend along and is bonded to a portion of the interior surface of the display cover. The display portion may further include a primer layer disposed over the peripheral side surface and the portion of the interior surface of the display cover. The primer layer may be configured to bond the trim member to the display cover. In some examples, the trim member may be adhered to the housing, thereby coupling the display cover to the housing.

The display cover may define a recess formed along the peripheral side surface. In some cases, the trim member extends into the recess. As another example, the housing may include a wall that defines the portion of the side exterior surface of the display portion and the trim member may be set apart from the wall by a gap. In some cases, the display stack is coupled to the interior surface of the display cover and the trim member may at least partially encapsulates a portion of the display stack. In some embodiments, the trim member is a single continuous loop of polymer material surrounding the peripheral side surface of the display cover.

In some embodiments, a laptop may include a base portion and a display portion. The base portion may have a top case that defines a user interface surface of the base portion. The display portion may be pivotally coupled to the base portion. The display portion may include a display housing with a wall that defines a side surface of the display portion and a first front-facing surface of the display portion. The display portion may also have a cover coupled to the display housing and defining a second front-facing surface of the display portion. In some cases, molded polymer member at least partially encapsulates a peripheral side of the cover and defines a bumper portion protruding from the first front-facing surface of the display portion, the bumper portion configured to contact the user interface surface of the base portion when the display portion is in a closed configuration relative to the base portion.

In some examples, the cover may define a recess extending into the peripheral side of the cover and the molded polymer member at least partially fills the recess, thereby mechanically retaining the molded polymer member to the cover. In other examples, the display housing defines a support surface along an interior side of the wall and the molded polymer member is coupled to the support surface via an adhesive layer.

The display portion may be coupled to the base portion via a hinge positioned along a bottom side of the display housing. The molded polymer member may define a display trim portion extending along a bottom side edge of the cover and a barrier portion extending from the display trim portion and positioned between the display trim portion and the bottom side of the display housing, the barrier portion defining a clearance recess. In some cases, a portion of the base portion extends into the clearance recess when the display portion is moved between the closed configuration relative to the base portion and an open configuration relative to the base portion.

In some cases, a first span of the bumper portion of the molded polymer member may extend a first height above the first front-facing surface of the display portion. The first span may extend along a first portion of the peripheral side of the cover. A second span of the bumper portion of the molded polymer member may extend a second height above the first front-facing surface of the display portion. The second span may extend along a second portion of the peripheral side of the cover. In some cases, the first height may be larger than the second height.

The molded polymer member may further include an attachment portion coupled to the bumper portion. The bumper portion may be coupled to the peripheral side of the cover and comprises a first material having a first hardness while the attachment portion may extend from the bumper portion to an inside surface of the wall of the display housing. In some cases, the attachment portion is formed from a second material having a second hardness less than the first hardness. The attachment portion may be configured to deform against the inside surface of the wall to form a water-resistant seal between the molded polymer member and the display housing.

A laptop may include a display portion and a base portion. The display portion may have a housing that defines a mounting feature and a display assembly positioned at least partially within the housing. The display assembly may include a display cover that defines a display surface and a first portion of a mounting surface of the display assembly and a trim member bonded to a peripheral side of the display cover. The trim member may define a protruding portion extending proud of the display surface of the display cover and a second portion of the mounting surface of the display assembly. The first portion of the mounting surface and the second portion of the mounting surface may be coupled to the mounting feature of the housing, thereby coupling the display assembly to the housing. The display assembly may also include a display component attached to an interior surface of the display cover. The base portion may have a keyboard and may be pivotally coupled to the display portion.

The trim member may define a wall segment with a front-facing camera region of the display assembly and a hole extending through the wall segment. The laptop may further include a camera module configured to receive light through the hole. In some cases, a transparent window may be positioned in the hole and may cover the camera module.

In some examples, the protruding portion of the trim member maintains the base portion a set distance away from the display portion when the display portion is in a closed configuration relative to the base portion. The peripheral side may define a cavity and the trim member fills the cavity, thereby mechanically coupling the display cover to the trim member.

The display assembly may extend a first distance from an interior surface of the display cover, and the trim member may extend a second distance greater than the first distance from the interior surface of the display cover.

In some embodiments, a laptop may include a base portion with a keyboard and a display portion. The display portion may be flexibly coupled to the base portion and positionable in an open configuration relative to the base portion and in a closed configuration relative to the base portion. The display portion may include a display stack, a display cover positioned over the display stack, and a housing. The housing may define a bottom surface and a wall extending from the bottom surface, the wall extending at least partially around a periphery of the display cover and the display stack. The wall may define an exterior peripheral surface of the housing, a side interior surface opposite the exterior peripheral surface, and a front-facing surface extending from the exterior peripheral surface to the side interior surface. The display portion may include a trim member positioned between the display cover and the housing and at least partially surrounding the display stack and the display cover, the trim member may be bonded to the side interior surface of the wall and to a portion of the bottom surface of the housing, the trim member defining a protruding portion protruding from the front-facing surface.

In some embodiments, the protruding portion is configured to contact the base portion when the display portion is in the closed configuration relative to the base portion. In some cases, the housing may define a recess along the bottom surface and the trim member may fill the recess and extend continuously from the recess to the protruding portion. In some examples, the recess is a first recess, the housing further defines a second recess along the bottom surface and adjacent to the first recess, the second recess deeper than the first recess, and the trim member fills the second recess and flows towards the first recess prior to curing.

In some cases, the laptop further includes a primer layer disposed over the side interior surface and the front-facing surface, the primer layer may be configured to bond the trim member to the housing. In some examples, the display stack is coupled to a portion of the bottom surface and in response to an input force at the display cover exceeding a threshold force, a peripheral portion of the display cover or the display stack are configured to contact the trim member. In some embodiments, the trim member may be a single continuous loop of polymer material at least partially surrounding the display cover.

Under some embodiments described herein, a laptop may include a base portion having a top case defining a user interface surface of the base portion and a display portion. The display portion may be pivotally coupled to the base portion. The display portion may include a display housing including a wall, the wall defining a side surface of the display portion and a first front-facing surface of the display portion, a cover coupled to the display housing and defining a second front-facing surface of the display portion, and a molded polymer member bonded to the wall and defining a protruding portion protruding from the first front-facing surface and from the second front-facing surface.

In some cases, the protruding portion is configured to contact the user interface surface of the base portion when the display portion is in a closed configuration relative to the base portion. In some examples, the display housing defines a cross-member coupled to the wall, the cross-member of the display housing defines a recess, and the molded polymer member fills the recess, thereby mechanically retaining the molded polymer member to the display housing.

In some examples, the display housing defines a plurality of receptacles positioned around a periphery of the display portion, the display portion further comprises a plurality of magnetic members, each magnetic member of the plurality of magnetic members may be positioned within a respective receptacle from the plurality of receptacles, and the molded polymer member at least partially fills the plurality of receptacles, thereby securing the plurality of magnetic members to the display portion. In some cases, the molded polymer member defines an opening and the plurality of magnetic members may be partially exposed through the opening. In some cases, the molded polymer member covers a top surface of the plurality of magnetic members. In some examples, the display portion may be coupled to the base portion via a hinge positioned along a bottom side of the display housing. The molded polymer member may define
- a trim portion extending along an interior surface of the wall, a barrier portion extending from the trim portion and positioned between the trim portion and the bottom side of the display housing, the barrier portion defining a clearance recess, and a corner region of the base portion extends into the clearance recess when the display portion is moved between a closed configuration relative to the base portion and an open configuration relative to the base portion.

In some embodiments described herein, a laptop may include a display portion having a housing. The housing may define a peripheral mounting surface and a bottom surface adjacent to the peripheral mounting surface. The display portion may also include a display assembly positioned at least partially within the housing and including a display cover defining a display surface and a display component attached to the bottom surface of the housing. The display portion may also include a trim member bonded to the housing that defines a protruding portion extending proud of the display surface and an interior portion formed along the peripheral mounting surface. In some cases, the interior portion may define a gap between the display cover and the housing. The laptop may additionally include a base portion comprising a keyboard and pivotally coupled to the display portion.

In some cases, the trim member defines a wall segment defining a front-facing camera region of the display assembly, and a hole extending through the wall segment. The laptop may further include a camera module configured to receive light through the hole. In some embodiments, the laptop may include a transparent window positioned in the hole and covering the camera module.

In some cases, the protruding portion may maintain the base portion a set distance away from the display portion when the display portion is in a closed configuration relative to the base portion. In some embodiments, a portion of the peripheral mounting surface is depressed with respect to the bottom surface and the trim member fills the depressed portion of the peripheral mounting surface. In some examples, the housing defines a plurality of injection regions defining a respective cavity that is deeper than the peripheral mounting surface.

BRIEF DESCRIPTION OF THE DRAWINGS

Reference will now be made to representative embodiments illustrated in the accompanying figures. It should be understood that the following descriptions are not intended to limit this disclosure to one included embodiment. To the contrary, the disclosure provided herein is intended to cover alternatives, modifications, and equivalents as may be included within the spirit and scope of the described embodiments, and as defined by the appended claims.

The use of the same or similar reference numerals in different figures indicates similar, related, or identical items.

Figure 1A:
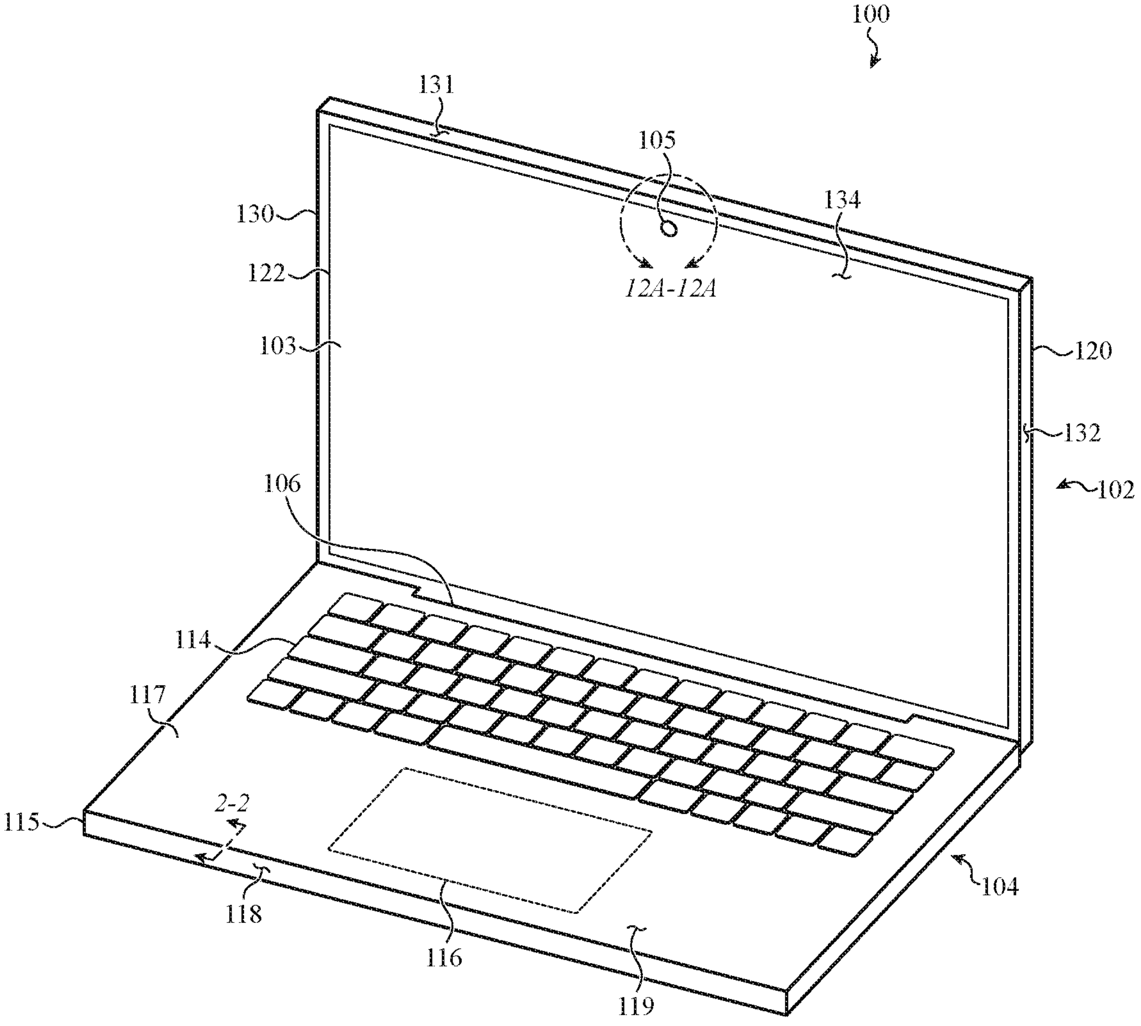
FIGS. 1A-1B depict an example electronic device.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

Embodiments described herein relate to portable electronic devices, including laptops, notebooks, and other foldable electronic devices. These portable electronic devices (or simply "electronic devices") typically include displays, such as LCD or OLED displays. These parts may be subject to impact or contact during use and operation of the device, which can result in damage to the display covers and/or other components of the display assembly. For example, in foldable devices, such as laptops or notebook computers, the display portion of the laptop is frequently closed against the base portion of the laptop. This opening and closing operation, as well as loading due to pressure applied to the laptop while closed, may risk impact and/or damage to the display.

Due to factors such as size, weight, and portability of the device, protective components and/or protective measures to prevent this damage to the display can alter the display size, weight, and overall look of the device. For example, a recessed display within a housing may increase the overall size of the housing and display, and may lead to increased weight. Protective covers over the main display (e.g., a protective plastic sheet) may be less durable and may scratch easily, and may not prevent the display components from being compressed when the device is closed. In some cases, prefabricated gaskets and/or other components may be provided around a cover to protect the glass cover. These prefabricated pieces may require large gaps around the glass cover for installation, thereby impacting the available display size for a given device. Moreover, the gaps required for installation and positioning of the gaskets may also leave visible gaps between the cover and the enclosure, and may also allow debris or contaminants to enter into the device.

Described herein are electronic devices, such as laptops, that include a trim member between a display cover (e.g., a glass cover) of a display assembly and a housing of the device. The trim member may be overmolded (e.g., via injection molding) over a peripheral side of the display cover, and may define a protruding portion that is configured to contact an upper surface of a base portion of the electronic device (e.g., the surface of a laptop that includes a keyboard, trackpad, and so on) when the device is in a closed configuration. In some cases, the trim member may be overmolded over a peripheral side of the housing, between the cover and the inside surface of the housing. Accordingly, the trim member may act as a bumper or cushion that protects the display cover (and display stack components) against damage, and optionally prevents or inhibits the display cover from contacting the base portion when the device is closed. By molding the trim member to the peripheral side of the display cover or to the housing to form an integrated structure, the trim member may provide protection to the display cover without the bulk, assembly gaps, and other drawbacks of separate trim pieces. As a result, a size of a display may be increased without requiring an increase in the overall housing size.

As discussed above, the trim member may be formed via an overmolding process. In some cases, a low-injection-pressure overmolding (LIPO) process may be employed. As an example, a LIPO process may be used to form a trim member that conforms to and bonds to a portion of the display cover, and optionally encapsulates portions of the display itself. The material that forms the trim member may bond to the display cover via an adhesive or adhesive-like bond. In some cases, the display cover includes engagement features, such as notches, depressions, recesses, groves, or other features that the molded trim member conforms to in order to mechanically engage the trim member to the cover.

In some cases, the trim member may resemble a thin polymer strip that extends around all or a portion of the periphery of a display cover or portions of the housing. In some cases, the trim member may further define camera regions, barrier portions, or other gasket regions that occlude or cover electronic components and/or serve other purposes within the device. For example, a barrier portion of a trim member may define a concave surface that pivots about the base portion base portion when the device is being opened and may act as a wiper or interface between both portions. As another example, a gasket region of a trim member may act as a cosmetic component that occludes flexible circuits and/or mechanical components from view. In yet another example, a camera region defined by a trim member may include openings for a camera module and may protect the camera module from contact with the base portion. In some examples, the trim member may fill receptacles of the housing in which magnetic members are positioned to secure a magnetic member to the housing without the use of adhesives.

These foregoing and other features are discussed below with reference to FIGS. 1A-16. However, those skilled in the art will readily appreciate that the detailed description given herein with respect to these figures is for explanation only and should not be construed as limiting.

Figure 1B:
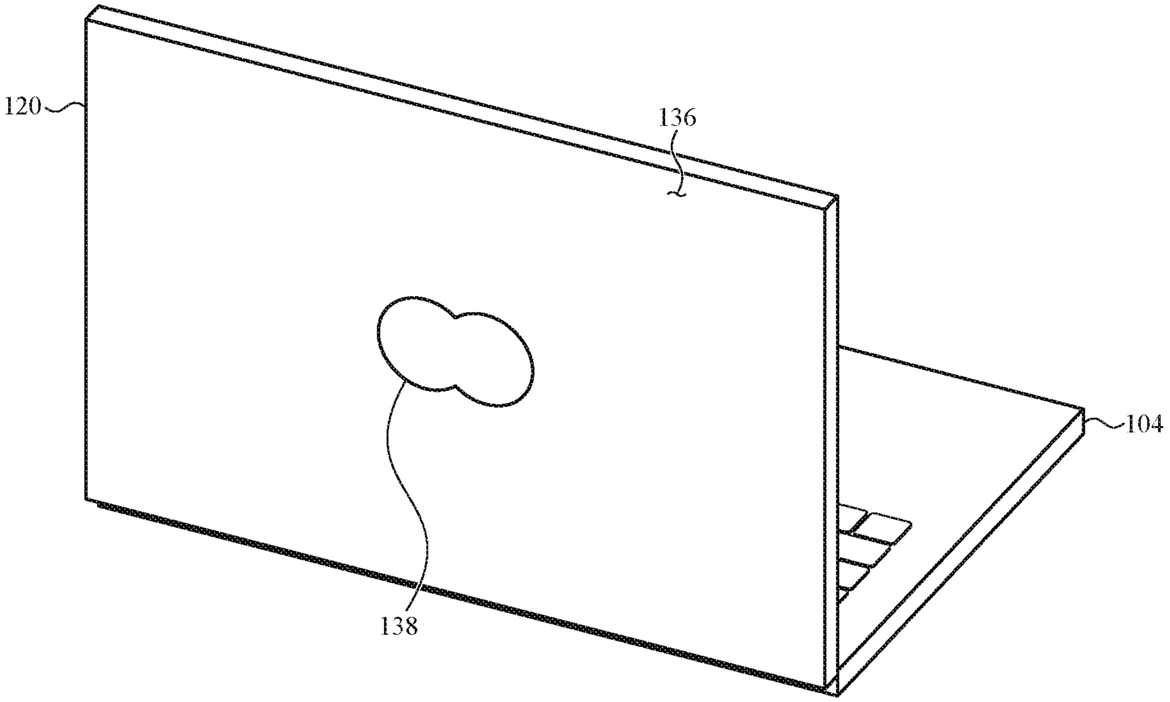

FIGS. 1A-1B depict an electronic device 100 (or simply "device 100"). The device 100 may be a portable computer, such as a laptop or notebook computer, that has a display portion 102 and a base portion 104 flexibly or pivotally coupled to the display portion 102 (e.g., so that the display portion 102 is able to rotate, pivot, flex, articulate, or otherwise move relative to the base portion 104). For example, the display portion 102 and the base portion 104 may be coupled via a hinge mechanism at one end of each portion and may have an open and a closed configuration. The hinge mechanism may be positioned in a central hinge region 106 of the device. In the closed configuration, an angle between the display portion 102 and the base portion 104 at a pivot axis may be 0 degrees or near 0 degrees. In the open configuration (as shown), the angle between the display portion 102 and the base portion 104 at the pivot axis may be an acute angle, a right angle, and/or an obtuse angle. In some embodiments, in the open configuration, the display region of the display portion and the user interface surface or region of the base portion (e.g., the upper surface of the base portion that includes a keyboard, trackpad, etc.) of the portable computer are accessible by the user, and the display region may define a front portion (or a front-facing portion) of the electronic device. In some cases, the electronic device may be a phone, tablet, or other portable electronic devices with folding features.

The display portion 102 (which may also be referred to as a lid) includes a display 103 for conveying visual information to the user, such as by displaying graphical user interfaces. In some embodiments, the display 103 is an organic light-emitting diode (OLED). In other embodiments, the display 103 is a liquid-crystal display (LCD). In other examples, other display technologies are envisioned. The display portion 102 also includes a camera 105. The camera 105 may capture images (e.g., still and/or video images), such as for videoconferencing functions, general image capture/recording, or the like.

The base portion 104 may define a user interface surface that may include a keyboard 114 and a trackpad region 116. The keyboard 114 may be any type of keyboard that can receive typing inputs. For example, the keyboard 114 may be a keyboard with moving keys (e.g., movable keycaps supported by a key mechanism such as a scissor mechanism). As another example, the keyboard 114 may be a virtual keyboard, such as a keyboard that is displayed on a touch-sensitive input surface (e.g., a touchscreen). Other types of keyboards may also be used.

The trackpad region 116 may be configured to detect touch- and/or force-based inputs applied to the base portion 104 in the trackpad region 116. For example, the trackpad region 116 may detect clicks, taps, gestures (e.g., swiping, pinching), multi-touch inputs, and the like. While FIG. 1A illustrates one example shape, size, and location of a trackpad region 116, other configurations are also possible. For example, the trackpad region 116 may be larger or smaller than that shown in FIG. 1A. In some cases, the trackpad region 116 may include substantially the entire region of the upper surface of the base portion 104 other than the keyboard 114. More generally, the base portion 104 may include various individual or combinations of user interface systems. For example, in some embodiments, the base portion 104 includes a display (such as a secondary display) and/or a touch screen. As another example, the secondary display may include a force sensor and/or a touch sensor.

In some embodiments, the base portion 104 includes a housing 115 and a top case 117. The housing 115 may define peripheral side surfaces 118 of the base portion 104, and the top case 117 may define a user interface surface 119 of the base portion 104. The housing 115 may also define a portion of the user interface surface 119 of the base portion 104. In some examples, the housing 115 includes a separate sidewall member that defines the peripheral side surfaces 118. The separate sidewall member may be coupled to a bottom structure of the device (e.g., defining a bottom surface of the base portion 104) and/or to the top structure or top case 117. In some embodiments, the housing 115 may be a monolithic piece that defines multiple structures of the base portion (e.g., the top wall, the bottom wall, and/or the peripheral side walls).

In some cases, the housing 115 is formed of a metal material, and the top structure or top case 117 is formed of glass, sapphire, ceramic, or glass ceramic. Other materials and combinations of materials are also contemplated for the housing 115 and the top case 117. For example, both the housing 115 and the top case 117 may be formed from metal (e.g., the same or different metals). In some cases, the base portion 104 may have a single component or structure that defines the side and user interface surfaces of the base portion 104.

The base portion 104 may also include electronic components. The electronic components may include all or some of the components described with respect to FIG. 12. For example, the electronic components may include one or more of a battery, a logic board, a processor, memory, a haptic device, a keyboard, a trackpad, a communication port, a charging port, battery charging circuitry, and the like. Other components (or systems or portions of systems) may also be included in (or otherwise coupled to) the base portion 104.

The display portion 102 may include a display housing 120 and a display cover 122. The display housing 120 may be formed from metal and may define a portion of at least three exterior peripheral sides 130, 131, 132 of the display portion 102 and/or the device 100. The display housing 120 may also define a portion of each of a display surface 134 and an outside surface 136 of the display portion 102 and/or of the device 100. The display enclosure 120 may define a sidewall (or simply wall) of the display enclosure 120, which defines the peripheral sides 130, 131, 132, a portion of the front-facing surface of the display portion, and/or a portion of the outside surface 136. In some embodiments, an outside layer defines at least a portion of the outside surface 136 and is coupled to the wall. In other embodiments, the display enclosure 120 may be a monolithic piece.

The display cover 122 may be formed from glass or another transparent material (e.g., ceramic, glass ceramic, a polymer, etc.), and may define at least a portion of the display surface 134. The outside surface 136 may include an indicia 138, such as a logo, icon, shape, or the like. In some cases, the indicia 138 may be defined by one or more layers (e.g., ink layers, deposited coatings, etc.) applied to a surface of a glass or other transparent material.

Figure 2A:
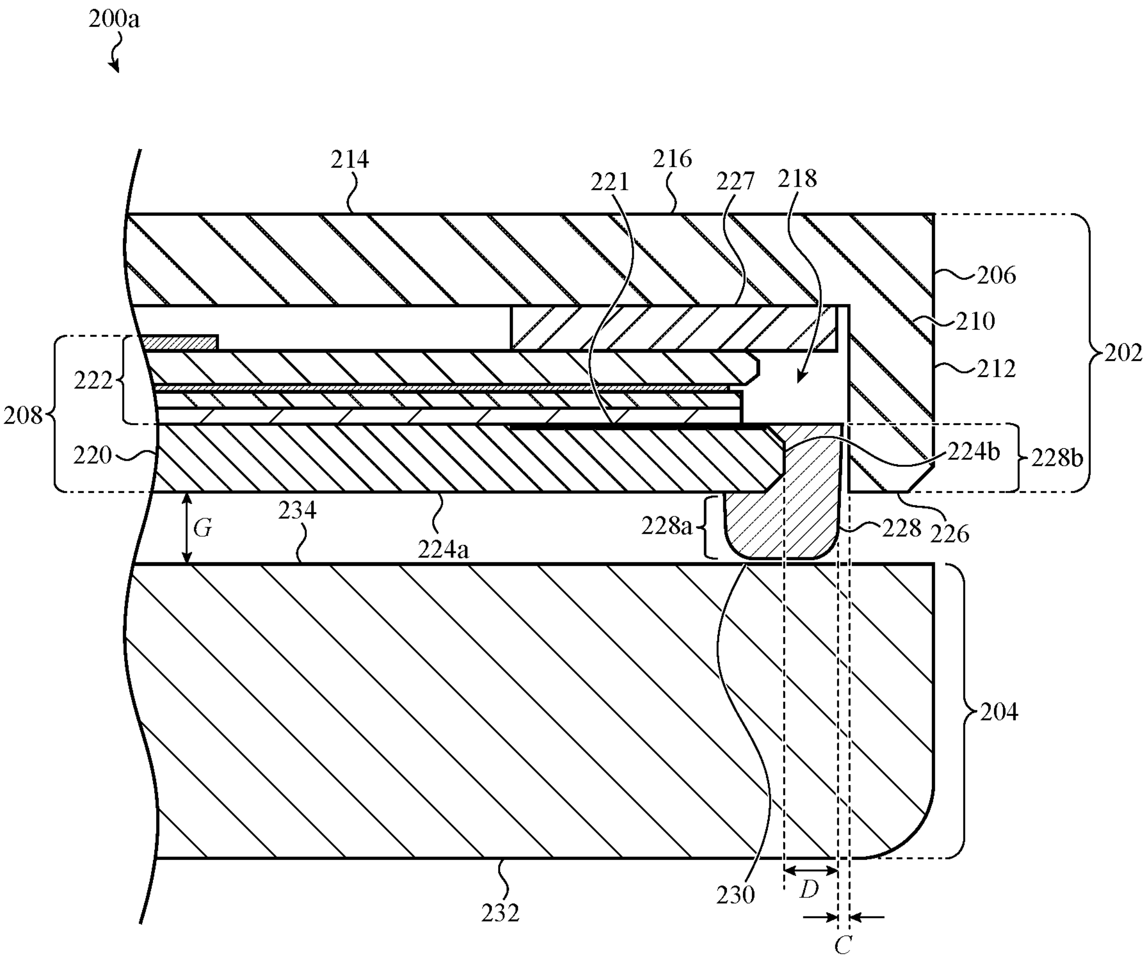
FIGS. 2A-2E depict partial cross-sectional views of example electronic devices in a closed configuration.

As discussed above, in a closed configuration, the display portion 102 and the base portion 104 may contact or come in close proximity. To protect the integrity of the display (e.g., the glass cover of a display stack), the display portion 102 may include components that can absorb and/or prevent impact to the display. FIG. 2A shows a cross-sectional view of an electronic device (e.g., electronic device 100) in a closed configuration with a protective component (e.g., trim member 228), as described herein.

As discussed above, the electronic device 200*a* may include a display portion 202 and a base portion 204. The display portion 202 may include a display housing 206 that is configured to enclose or partially enclose electronic components of the electronic device 200*a*. For example, the display housing 206 houses the display assembly 208 of the electronic device 200*a*.

In some embodiments, the display housing 206 includes a sidewall 210. The sidewall 210 may define an exterior side surface 212 of the display housing 206 (e.g., a portion of an exterior side surface of the electronic device 200*a*). As depicted in FIG. 2A, the exterior side surface 212 has a straight profile, though other profiles and/or finishes are envisioned. As described above, the sidewall may be made from a metal material, glass, sapphire, plastic, or any other materials or combination of materials.

The display housing 206 may also include a top structure 214. The top structure 214 may be a cover, a metal layer, a glass layer, and so on. In some embodiments, the top structure 214 is coupled to the sidewall 210. In some cases, the top structure 214 and the sidewall 210 are formed from a monolithic piece (e.g., formed from a single piece of material, such metal). The top structure 214 defines an outside surface 216 of the electronic device. In some examples, the top structure 214 and the sidewall 210 cooperate to define the outside surface 216 and together may define a continuous surface that includes the outside surface 216 and the exterior side surface 212. As discussed above, the display housing 206 at least partially encloses electronic components of the electronic device 200*a*. More specifically, the sidewall 210 and the top structure 214 may define a cavity 218 which houses the display assembly 208 and/or other electronic components.

As depicted in FIG. 2A, the display portion 202 includes a display assembly 208. The display assembly 208 (or display stack) may include a cover 220 and display components 222 (e.g., pixel layers, backlights, filters, optical films, substrates, and/or other components that form part of the display). In some cases, the display assembly 208 includes a light-blocking mask 221 (e.g., an opaque mask, which may be or may appear black) positioned between the cover 220 and the display components 222 around a periphery of the display assembly 208. The display may include a glass layer positioned over an end of the display stack. As an example, the display stack may be an OLED display, though other display technologies are envisioned.

The cover 220 may define a display surface 224*a* of the display portion 202. In some cases, the display surface 224*a* may be referred as a front surface. For example, in an open configuration, the display or front surface is configured to face the user. In some examples, the cover 220 defines a surface area that occupies a majority of a front-facing surface of the display portion 202. The cover 220 may be made of glass, plastic, or any other optically transmissive (e.g., transparent) material, or combination of materials as may be known to one of skill in the art. In some cases, the cover 220 defines a layer of the display assembly 208 (e.g., an outer-most layer) and may be positioned at least partially within the housing 206. In some cases, the display surface 224*a* is aligned or substantially aligned with a peripheral front surface 226 of the sidewall 210. The cover 220 may define a side surface 224*b*. The side surface 224*b* may be at least partially within the cavity 218 and/or overlapped by the sidewall 210. In some cases, the side surface 224*b* of the cover 220 and an inside surface of the sidewall 210 define a distance D. The distance between the side surface 224*b* of the cover 220 and the inside surface of the sidewall 210 may vary along the perimeter of the electronic device 200*a*. In some cases, the cover 220 may not directly contact the housing 206.

The display assembly 208 may be coupled to the housing 206 via an adhesive 227. In some cases, the adhesive 227 may extend along a portion of the top structure 214, and/or along a portion of the sidewall 210. In some cases, the adhesive 227 extends around an inside surface of a peripheral portion of the housing 206.

In some cases, the display portion 202 includes a trim member 228. The trim member 228 may be positioned between the cover 220 and the housing 206. In some embodiments, the trim member 228 is positioned between the cover 220 and the sidewall 210. The trim member 228 may be bonded to the side surface 224*b* of the cover 220. As depicted in FIG. 2A, the trim member 228 may protrude from (e.g., extend proud of) the cover 220 and/or from the display surface 224*a* of the cover 220. In some examples, the trim member 228 also protrudes past (e.g., extends proud of) the sidewall 210 and/or from the peripheral front surface 226 of the sidewall 210. In this configuration, the trim member 228 is configured to act as a bumper to the cover 220. For example, in a closed configuration (as shown) the trim member contacts the base portion 204 (e.g., at interface surface 230) and thus prevents or inhibits the cover 220 from contacting the base portion 204. The protruding portion of the trim member 228 may define a gap G between the display portion 202 (e.g., at display surface 224*a*) and the base portion 204 (e.g., at the user interface surface 234). By preventing the cover 220 from contacting the base portion 204, the trim member 228 may protect the cover from failure, cracking, dents, or other damage. The trim member 228 may also define a clearance C between the inside surface of the sidewall 210 and a the trim member 228. The clearance C may the distance that the trim member 228 is set apart from the sidewall 210. The clearance C may allow the trim member and cover assembly to be positioned in the housing during assembly of the device.

The trim member 228 may be a polymer, such as an epoxy, phenolic, diallyl phthalate and other thermoset materials, thermoplastic elastomer, thermoplastic polyurethane, thermoplastic rubber, silicone, polypropylene, polyoxymethylene, acrylic, polybutylene terephthalate, polyetherimide, polyethylene, polycarbonate, polyamide, polyester ether ketone, high-density polyethylene, acrylonitrile butadiene styrene, or any other materials or combinations of materials.

The trim member 228 may be formed using an injection molding process. The cover and/or the display assembly may be inserted within a mold that with a cavity surrounding the portions of the cover that will form the trim member. A resin is then introduced within the cavity in a flowable state. In some cases, the resin may be under high temperature or high pressure. In other cases, such as using a LIPO process, lower pressures may be used. The resin flows through the cavity and conforms to the shape of the cavity and/or the cover or display assembly. The material may then be cured into a solid state. The resulting trim member is mechanically engaged with the cover or display assembly.

The trim member 228 may be formed over the cover 220 via an injection molding (e.g., overmolding) process. For example, the trim member 228 may be a molded polymer member that is formed over a portion of the cover 220 (e.g., around side surface 228*b*, around a portion of the display surface 228*a*, around a portion of a surface opposite the display surface, and so on). The trim member 228 may extend around the entire periphery of the cover 220. However, in some embodiments extends around a portion of the periphery of the cover 220.

During the overmolding process, a surface of the cover 220 to be bonded to the trim member 228 may be primed to improve the bond strength between the cover 220 and the trim member 228. In other configurations, other surface treatments may be performed on the cover 220 to improve bonding strength. Once the trim member is formed on the peripheral side of the cover, the trim member with the cover may be cured. The overmolding process may be a low-pressure injection molding (LIPO) process. Using a LIPO process may allow the trim member 228 to be formed over the cover and over other display component(s) 222 or other sensitive electronic components. Examples of these embodiments are described in FIGS. 2C and 2D below. Regardless of the overmolding process used, the cover 220 may be bonded to the trim member 228 prior to assembly of the display portion 202 to the housing 206. As another benefit of this configuration, the trim member 228 may protect the cover 220 from damage during manufacturing, shipping, and/or assembly processes of the electronic device 200*a*.

Further, by overmolding members over one or more of the components (e.g., the cover, other display assembly components, the housing, and so on), the gap and/or space needed between the display assembly and the housing may be decreased. For example, in configurations where a gasket or trim is pre-formed separately from the display cover, a relatively large gap may be needed to fit the pre-formed piece between the cover and the housing. This may result in more manufacturing and handling steps and may result in less precise fits (e.g., a relatively large gap may remain between the gasket and either or both the housing and the cover). By contrast, by overmolding a trim member over the peripheral side of the cover, the gap may be decreased by a factor of approximately 2, 3, or 4, in some cases, relative to the gap that remains in instances where a separately formed cover is manually inserted into a space between the cover and the housing. Accordingly, more precise fits, more display space, and/or less potential for water ingress and/or ingress of contaminants is achieved.

Returning to FIG. 2A, the base portion 204 of the electronic device 200*a* may include a bottom housing 232. Similar to the housing 206 described above, the bottom housing 232 may be a metal, glass, plastic, or any suitable material or combination of materials and may define a cavity (not shown) configured to house and/or partially enclosure electrical components. The bottom housing 232 and/or a top case structure may define a user interface surface 234. The user interface surface 234 may be accessible to a user in an open configuration of the laptop and may include a keyboard region, a trackpad, a secondary display, and/or other user interface regions and/or input systems. The trim member 228 may contact the user interface surface 234 (e.g., at interface surface 230) in the closed configuration. As a result of this configuration, the user interface surface 234 and the display surface 224*a* may be separated in a closed configuration, thereby preventing damage to the cover 220, to the user interface surface (e.g., which may comprise a glass material), or both.

Figure 2B:
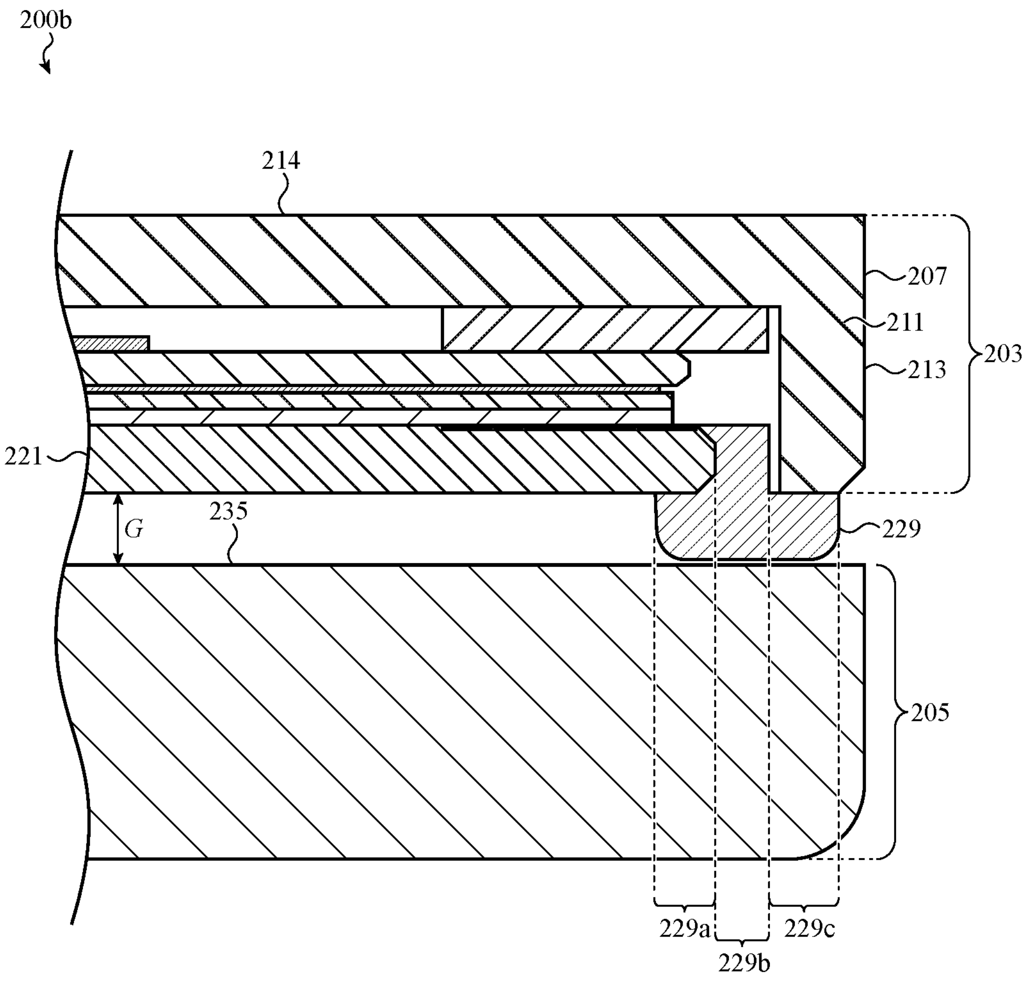

In some embodiments, the trim member is positioned between the sidewall and the user interface surface. For example, the trim member may extend over a portion of the sidewall of the housing (e.g., covering the gap between the cover and the housing and extending onto the sidewall of the housing) and may be configured to contact the user interface surface of the bottom housing when the device is in a closed configuration. FIG. 2B depicts a cross-sectional view of a portable electronic device 200*b* in a closed configuration where the trim member covers a portion of the sidewall while being coupled to the cover. The portable electronic device 200*b* may have a similar configuration and components as the electronic device described in FIG. 2A, and the description of those components applies equally to the portable electronic device 200*b*.

Unlike the trim member 228 of FIG. 2A above, a trim member 229 covers a front-facing portion of the sidewall, and covers, eliminates, or at least partially fills a front-facing gap between the trim member and the sidewall. As depicted, the trim member 229 may include three portions. A first portion 229*a* extends from a cover 220 (e.g., it is mechanically engaged to the cover). The first portion is configured to contact a user interface surface 235. A second portion 229*b* of the trim member fills and/or extends across the gap between the cover 220 and the sidewall 211. The second portion 229*b* may also contact the user interface surface. A third portion 229*c* is positioned between the sidewall 211 of a housing 207 (e.g., a front-facing surface of the sidewall 211) and the user interface surface 235. As shown in FIG. 2B, the first, second, and third portions may fill or define a gap between the sidewall 211 and the user interface surface 235. While the trim member 229 is shown as extending partially over a thickness of the sidewall 211 (e.g., such that the trim member 229 and the top structure 214 of the sidewall 211 are not flush), in some variations, the trim member may extend to an external surface 213 of the sidewall 211, thereby defining a substantially flush surface between the display portion 203, the trim member 229, and the base portion 205. The trim member 229 at the third portion 229*c* may be adhered to the sidewall. In other cases, the sidewall may define cavities, channel, or other features to mechanically couple the trim member 229 to the sidewall 211.

By extending the size of the trim member 229 (e.g., such that a portion 229*c* of the trim member 229 is between the sidewall 211 and the user-interface surface 235), the contact area between the trim member 229 and the user interface surface 235 increases (thereby providing more protection) without covering a larger portion of the display area. The contact between the sidewall 211 and the trim member 229 (at the third portion 229*c*) also provides additional surfaces for adhering the trim member 229 to the housing 207. In the closed configuration, bringing the trim member closer to the external surface 213 (e.g., towards the periphery of the portable electronic device) provides a more uniform appearance and it may prevent contaminants from entering the device in a closed configuration (e.g., through gap G and clearance C of FIG. 2A). As another benefit, in a closed configuration, when a load is applied to the electronic device, the third portion 229*c* of the trim member may push against the sidewall 211 which helps absorb the load compared to pushing against the cover (and thereby pushing against the display assembly). Therefore, the cover and the display assembly may be less prone to unintended loading conditions which allows for lighter designs of the display assembly (e.g., thinner cover, etc.).

Figure 2C:
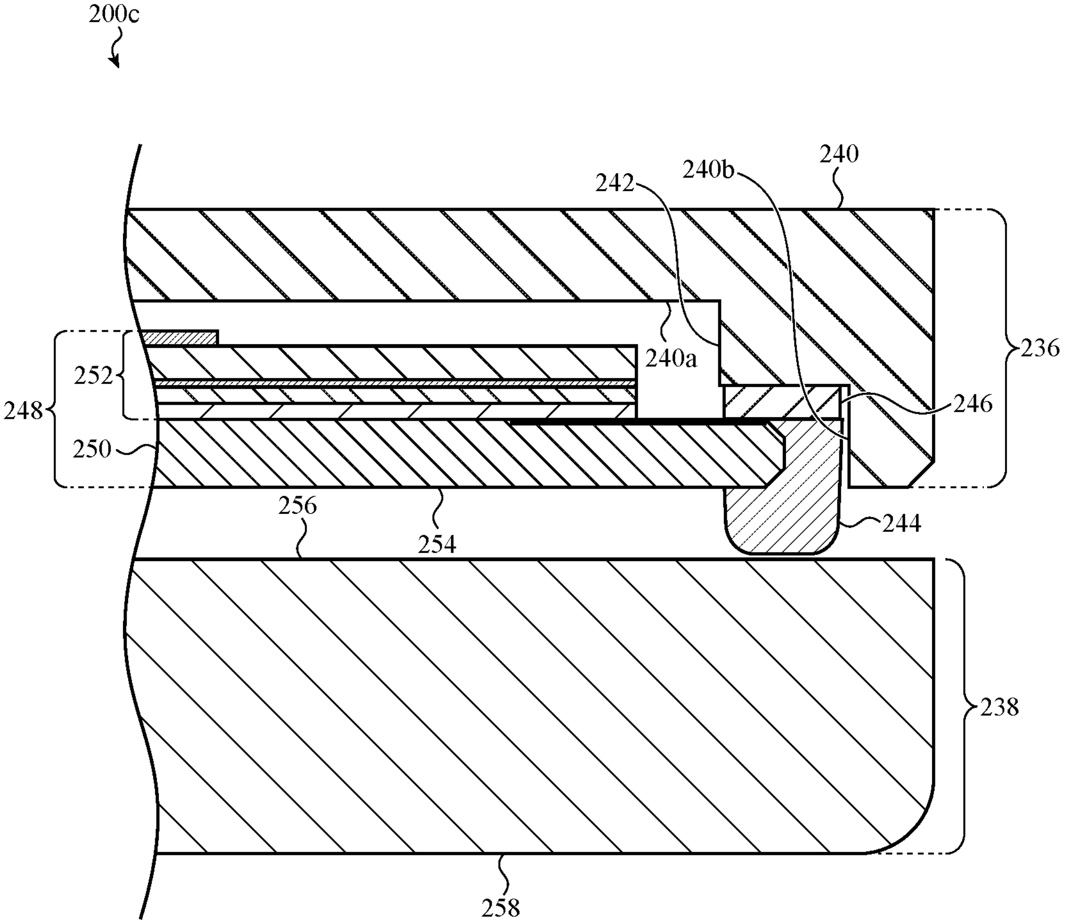

In some embodiments, the trim member is overmolded with the cover and also defines a portion of a mounting surface that is used to couple the cover to the display housing. FIG. 2C depicts a cross-sectional view of a portable electronic device 200*c* in a closed configuration. Similar to device 200*a* and 200*b*, device 200*c* may be a laptop, notebook, and/or other portable electronic devices. The device 200*c* may include a display portion 236 and a base portion 238. As described above, the display portion 236 may include a display or a primary display of the device 200*b* while the base portion may include user input systems, including keyboards, secondary displays, trackpads, and so on.

More specifically, the display portion may include a housing 240, similar to housing 206. The housing 240 may define inside surfaces 240*a* and 240*b* and include a shelf 242 between inside surfaces 240*a* and 240*b*. The shelf 242 protrudes within a cavity of the housing 240. The shelf 242 may define a stepped profile that may be configured to support one or more electronic or mechanical components. In this configuration, the shelf 242 may be configured to support and/or couple to a trim member 244 (e.g., at a mounting surface of the trim member). While a shelf is described, other support structures are envisioned. For example, the trim member 244 may be coupled to the housing 240 via an adhesive 246, which, in turn, couples a display assembly 248 to the housing 206.

The display portion 236 may also include a display assembly 248. The display assembly 248 may include a display cover (or simply "cover") 250 and display components 252. The cover 250 may define a display surface 254 of the device 200*b* and may be a glass cover or other optically transmissive cover. The display components 252 may be a display stack, such as those described with respect to display components 222 above. The display components may be an LCD display, though other display technologies are envisioned. The trim member 244 may be coupled to the cover 250. For example, as described above, the trim member 244 may be overmolded over a side of the cover 250, around the periphery of the cover. In some cases, the trim member 244 extends around the entire periphery of the cover 250. In other cases, the trim member 244 may extend around portions of the periphery of the cover 250.

As depicted in the figure, the trim member 244 may cover all or a substantial portion of the peripheral side of the cover 250 which defines the thickness of the cover 250. In this configuration, the periphery of the cover 250 is enclosed by the trim member, thereby protecting the sides of the cover and providing the gap between the display portion and the base portion. However, in other embodiments, the trim member 244 may extend only partially around the peripheral side of the cover 250. In other examples, the trim member 244 may also extend over a portion of the display surface of the cover 250. In this configuration, the trim member 244 covers the peripheral sides and a portion of the display or front of the cover 250, thereby providing additional bonding area (e.g., the surface area of the bonding interface) between the trim member and the cover. In yet other examples, the trim member wraps over a portion of the display surface, the side of the cover, and a back surface (e.g., opposite the display surface) of the cover. By wrapping around the side and the front and back surfaces adjacent to the sides, the bonding between the trim member and the cover improves and it creates a mechanical engagement that can resist loading in a vertical and horizontal directions. This configuration is enabled by injection molding, and in some cases the LIPO process because it allows the trim member to be formed over components, like the display, which may be sensitive to high pressure. Accordingly, a higher and more direct level of protection can be provided to the cover without adding more mechanical protections or materials that can impact the size of the device.

Regardless of the size and/or shape of the trim member 244, the trim member 244 defines a protruding portion that is proud of the main front-facing surfaces of the display portion and that is configured to contact the base portion 238, thereby defining a separation between the cover 250 and/or the display surface 254 and the base portion 238 and/or a user interface surface 256.

In some embodiments, the adhesive 246 is configured to couple the housing 240 to the trim member 244 and to the front cover 250. In this configuration, the display assembly 248 may be supported by the trim member 244 and the cover 250 instead of internal or other components of the display portion, such as the display components 252.

The base portion 238 of the electronic device 200*b* may include a bottom housing or bottom housing 258. Similar to the bottom housing or bottom housing 232 of FIG. 2A, the bottom housing or bottom housing 258 may at least partially enclose electronic components of the electronic device 200*b* and may be made from any suitable materials or combination of materials. The bottom enclosure or bottom housing 258 may be coupled to a cover member that defines the user interface surface 256. The user-interface cover may define user-interface regions, such as a keyboard region, trackpad region, secondary display region, or it may be a monolithic piece, such as glass, that defines a display, a virtual keyboard, and so on.

As described in FIGS. 2A, 2B, and 2C above, the display assembly may include a display stack (e.g., display stack 208, 248). In some cases, the display stack may be an organic light-emitting diode (OLED) display, a liquid-crystal display (LCD), and so on. FIGS. 2A and 2B depicts a simplified example of an OLED display where the display stack includes, among other components, a glass layer positioned on and/or defining a back (e.g., interior-most side) of the display stack, for example. The trim member may accommodate (e.g., conform to) the geometry and/or different layers of the display, regardless of the particular geometry of the display or the display technology used. FIG. 2C depicts a simplified example of an LCD display where the display stack may include liquid crystal layers, glass layers, polymer layers, and so on. It should be understood that the trim member geometries shown in FIGS. 2A, 2B, and 2C are not exclusive to a particular display technology. Instead, the trim member may be formed over different types of display technologies with varying geometries.

Figure 2D:
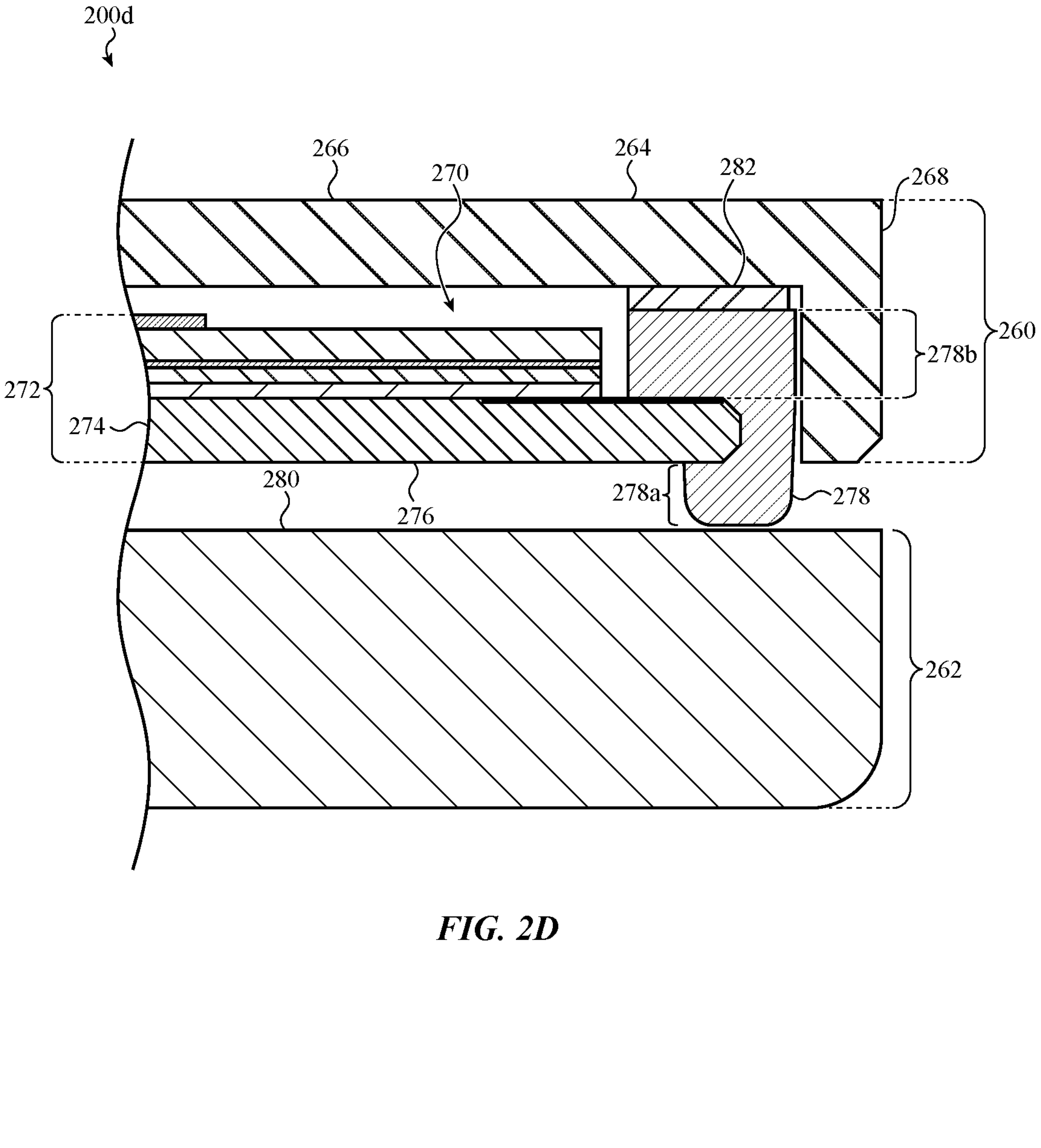

In some examples, the trim member extends along (and bonds to) a portion of an interior surface of a cover. FIG. 2D depicts an example of electronic device 200*d* with the trim member extending in this configuration. More particularly, the trim member 278 depicted in FIG. 2D extends proud of the interior surface of the cover and defines a mounting or attachment surface for coupling the display assembly 272 to the housing 264.

More specifically, the device 200*d* includes a display portion 260 and a base portion 262. The display portion 260 has a housing 264 that at least partially encloses electronic components, such as a display. The housing 264 may include a top structure 266 and a sidewall 268. In some cases, the sidewall 268 surrounds a periphery of the top structure 266 and defines a side surface of the electronic device 200*d*. The top structure 266 and the sidewall 268 cooperate to define a cavity 270 that is configured to receive electronic components, such display assembly 272. In some cases, the display assembly 272 includes a cover 274 that defines a display surface 276 of the electronic device 200*d*.

The display portion 260 may include a trim member 278 that is coupled to the cover 274. For example, the trim member 278 may be coupled to the cover 274 by overmolding the trim member 278 over the cover 274, as described herein. The trim member 278 may define a portion 278*a* that protrudes from the display surface 276 and contacts a user interface surface 280 of the base portion 262. The trim member 278 may further define a portion 278*b* that protrudes from an interior surface of the cover 274 (e.g., the surface opposite the display surface 276). In some cases, the portion 278*b* defines a mounting surface that is used to couple the trim member 278, and thus the display assembly, to the housing 264. For example, as depicted in FIG. 2D, the portion 278*b* extends beyond the interior surface of the cover 274. In this configuration, the trim member 278 may be coupled to the top structure 266 or portion of the housing along the top (e.g., with respect to the page) of the display surface via an adhesive 282. The portion 278*b* that interfaces with top structure 266 may have a larger surface area than the portion 278*a* that interfaces with the user-interface area 280 of the base portion 262. In some cases, the narrowest portion of the trim member 278 may be the portion of the trim member between the periphery of the cover 274 and the inside surface of the sidewall 268. More generally, the overmolding process provides a wide variety of structural options, which may accommodate different geometries of the cover, the housing, and/or the display assembly. For example, the geometry and volume of the trim member may be dimensioned to abut to the housing (e.g., to attach to the housing) and may define mounting surfaces to adhere to the housing. The mounting surface may be large to accommodate heavier assemblies without significantly modifying the profile of the inside surface of the housing. As another advantage, the inside profile may be simplified due to the trim member. As yet another example, the shape of the trim member along the perimeter of the display portion may be varied to accommodate other geometries needed in different regions of the display portion (e.g., a hinge region of the display portion may require additional gasket portions or barrier portions, as described in FIGS. 7 and 9 below).

The trim member 278 may be formed over the periphery of the cover 274 using an overmolding process. Once formed (or before overmolding the trim member 278 over the cover), display components of the display assembly 272 may be assembled over the cover 274. Accordingly, the trim member 278 and the display components may not be coupled. For example, the trim member 278 and the display components may not contact each other, as depicted in FIG. 2D.

Figure 2E:
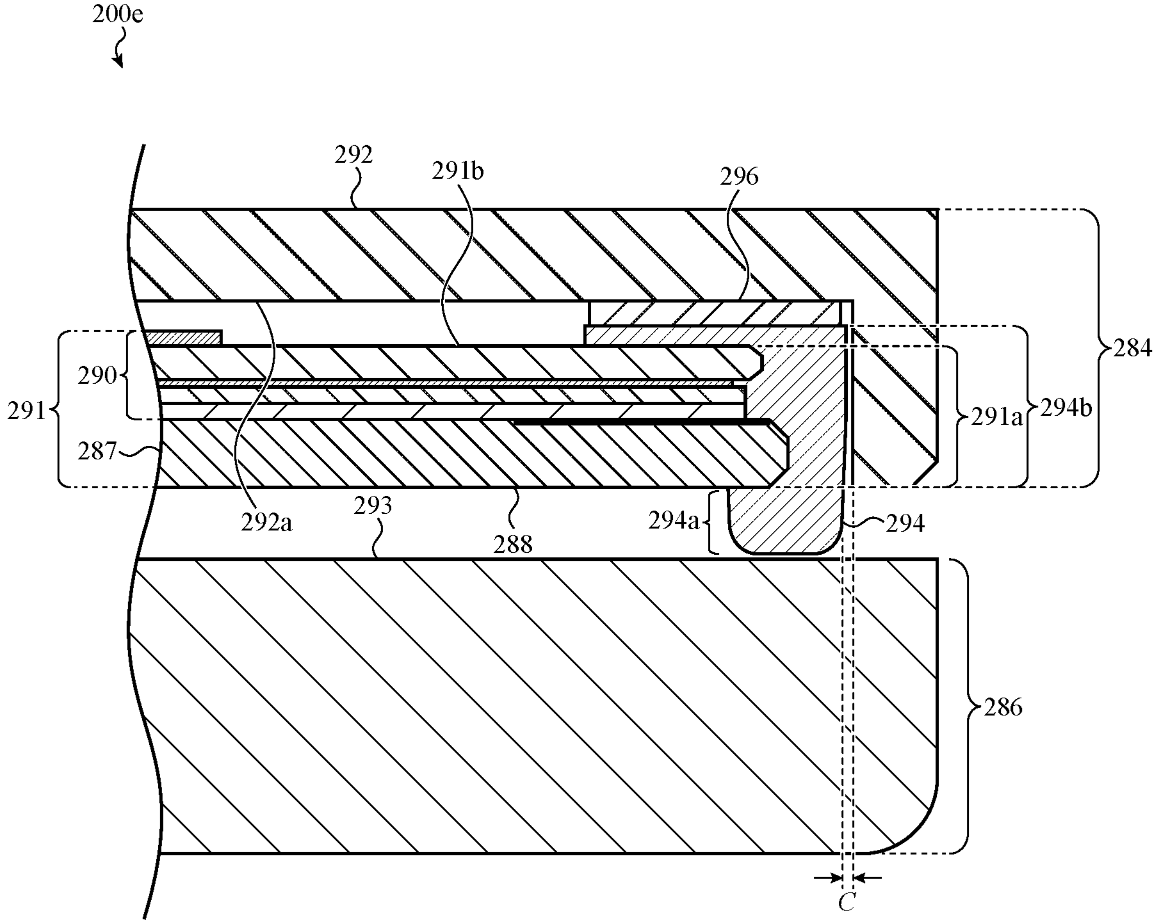

In some cases, the trim member may at least partially encapsulate the cover and display components of the display assembly. FIG. 2E depicts a cross-sectional view of an example electronic device 200*d* with an overmolded trim member at least partially encapsulating (and bonded to) display components. As described previously, the electronic device may include a display portion 284 (e.g., a lid of a laptop) and a base portion 286 (e.g., a bottom or base of a laptop). The display portion 284 and the base portion 286 may be substantially parallel to each other in a closed position yet maintain separation due at least in part to the overmolded trim member that acts as a bumper for the cover (e.g., a cover glass) and thus protects fragile display assembly components from impact and/or failure.

The display portion 284 may include a cover 287 and display components 290, which collectively form the display assembly 291 (or display stack). The cover 287 defines a display surface 288 of the device 200*c*. As explained above, the display surface may be referred as a front surface or a front-facing surface. For example, in an open configuration, the display or front surface is configured to face the user.

The display assembly 291 may also define a peripheral side 291*a* (which includes the peripheral side of the cover 287 and the peripheral side of the display components 290). The display portion 284 may include a housing 292 that at least partially encloses the display assembly 291 (also referred to as a display stack). In some cases, the side of the housing 292 is larger than the side of the display assembly 291.

In some embodiments, a trim member 294 is coupled to the display assembly 291. The trim member 294 may include a first portion 294*a* that protrudes from the display surface 288 and contacts a user interface surface 293 of the base portion 286 when the device 200*e* is in a closed position. The first portion 294*a* may wrap around a portion of the display surface 288 of the cover 287, though other configurations are envisioned. The trim member 294 may also define a second portion 294*b* that extends from the display surface 288, over the peripheral side surface 291*a* of the display assembly 291. In some cases, the second portion 294*b* may extend over a portion of the peripheral side 291*a*. In other configurations, the second portion 294*b* wraps around all of the peripheral side 291*a* and extends along a portion of a back surface 291*b* of the display assembly 291.

In some examples, the geometry of the trim member 294 is achieved by overmolding the trim member 294 over the display assembly 291. In some cases, due to sensitive and/or pressure-sensitive display components, the overmolding may be performed using a LIPO process, as explained above. Since a lower pressure is used in this example, sensitive display components can withstand the process without damage. Accordingly, the sides and ends of the cover and/or the display assembly are protected from impact, and the clearance between the display assembly and the side members of the housing may be reduced. In some cases, as explained above, the cover, display assembly, and/or other component surfaces that are coupled to the trim member may be primed to increase the adhesion between the display assembly and the trim member.

The trim member 294 may define a support surface for coupling the trim member (and, in some cases, the display assembly) to the housing 292. In some examples, the support surface of the trim member 294 is coupled to an inside surface 292*a* of the housing via an adhesive 296. In some cases, the portion of the trim member that extends along the back surface 291*b* is coupled to the inside surface of the trim member. In this configuration, the display assembly 291 is secured to the housing 292 via the trim member 294. While the inside surface 292*a* of the housing is shown as flat, the inside surface may include additional features (e.g., shelfs, ledges, and so on) to accommodate the geometry of the display assembly and/or of the trim member. In some examples, the trim member 294 is coupled to the inside surface 292*a* along the top structure of the housing but may not be coupled to the portion of the inside surface 292*a* along the sidewall of the housing. In this configuration, the trim member and the inside surface 292*a* along the sidewall of the housing may define a clearance C.

These foregoing embodiments depicted in FIGS. 2A-2E and the various alternatives thereof and variations thereto are presented, generally, for purposes of explanation, and to facilitate an understanding of various configurations and constructions of a system, such as described herein. However, it will be apparent to one skilled in the art that some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

In some embodiments where the trim member is coupled to the cover, the cover may define shapes and/or features to increase the mechanical engagement between the trim member and the cover and thereby improve the bonding strength between the parts and prevent or inhibit detachment of the trim member. Various examples of a cover with different shapes and/or features to increase engagement with a trim member are presented in FIGS. 3A-3D. These examples are presented for illustrative purposes and are not intended to be exhaustive of possible geometries.

Figure 3A:
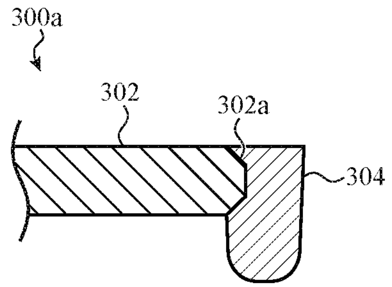
FIGS. 3A-3D depict partial cross-sectional views of example display covers for an electronic device.

FIG. 3A presents a detail view of a trim member (e.g., trim member 228 from FIG. 2A), illustrating an example cover and trim member assembly, referred to as a cover assembly 300*a*. In the cover assembly 300*a*, the cover 302 defines a peripheral side surface 302*a*. The peripheral side surface 302*a* defines a chamfered edges at the interfaces between the peripheral side surface and the front and back sides of the cover. In this configuration, a trim member 304 conforms to the profile of the side surface. Using chamfered edges (which creates a tapered profile) provides a feature that the trim member can wrap around thereby improving mechanical engagement of the trim member to the cover (e.g. by increasing the surface area between the trim member and the cover compared to a flat profile. The depicted profile may also counteract forces applied in a vertical direction (e.g., up and down the page), thereby helping prevent detachment or delamination of the trim member 304 from the cover 302.

Figure 3B:
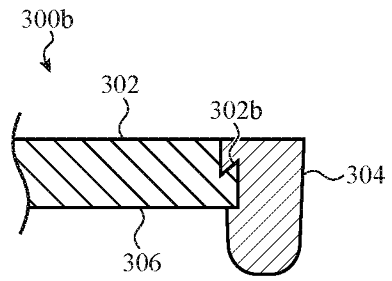

FIG. 3B presents a detail view of a trim member (e.g., trim member 228 from FIG. 2A), illustrating an example cover and trim member assembly, referred to as cover assembly 300*b*. In the cover assembly 300*b*, the cover 302 includes a peripheral side surface 302*b* which defines a notched profile. The trim member 304 conforms to the side surface 302*b* and the notched profile, thereby interlocking with the cover 302 (e.g., defining a mechanical interlock between the trim member 304 and the cover 302). In this configuration, due to the geometry of the notched profile, vertical (e.g., up and down the page) and horizontal (e.g., left and right of the page) forces may be resisted by the trim member, thereby helping to prevent delamination. The trim member may also include a portion that is overmolded over a portion of a display surface 306.

Figure 3C:
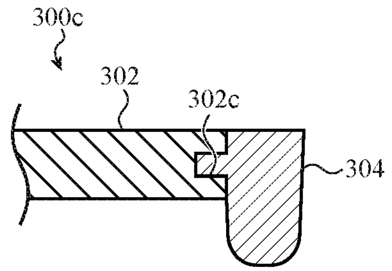

FIG. 3C presents a detail view of a trim member (e.g., trim member 228 from FIG. 2A), illustrating an example cover and trim member assembly, referred to a cover assembly 300*d*. In the cover assembly 300*c*, the cover 302 may have a peripheral side surface 302*c* that includes a recess or cavity. In some cases, the recess or cavity may define square surfaces. In other examples, the recess or cavity may be a rounded surface or other geometries or combination of geometries. In this example, the trim member 304 fills the depression or cavity (e.g., during the overmolding process). As a result, the surface area between the cover 302 and the trim member 304 is increased (e.g., compared to a flat surface), and an interlock is created which counteracts forces in a vertical direction (e.g., up and down the page). In many configurations, a primer may be applied. In other configurations, the trim member may bond directly to the cover (e.g., due to the geometry). In yet other examples, the cover may have a surface preparation, such as surface texturing, plasma treatment, primers, etching, and so on, to improve the bonding strength between the trim member and the cover. The surface texturing may refer to surface alterations, such as forming, micro grooving, micro dimples, micro channels, or similar processes that add a surface texture to the cover. Plasma treatment may refer to making a glass surface hydrophilic to increase its surface energy and improve wettability and thus improve adhesion and to remove surface contaminants. A primer may refer to any coupling agent that may function as an adhesive to the glass and other substrates or materials. Etching may refer to applying acidic, caustic or abrasive substances to the surface of the glass to roughen its texture in selected areas.

Figure 3D:
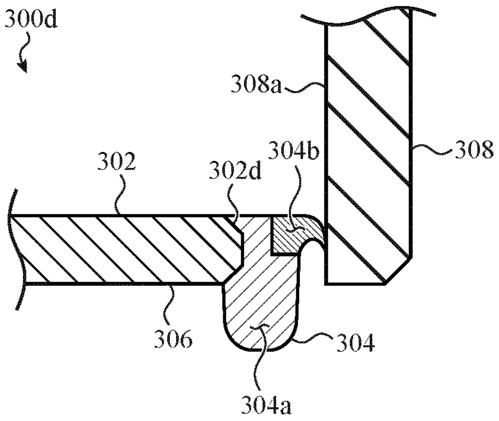

FIG. 3D presents a detail view of a trim member (e.g., trim member 228 from FIG. 2A), illustrating an example cover and trim member assembly 300*d*. In the cover assembly 300*c*, the trim member 304 may include two sections, 304*a* and 304*b*. Section 304*a* may be coupled to a peripheral side surface 302*d* of the cover 302 and may protrude from the display surface 306 to contact a user interface surface (see, e.g., FIGS. 2A-2D) thereby maintaining a separation between the cover 302 and the user interface surface and base portion of the electronic device. Section 304*b* may extend towards a sidewall 308 of the housing. In particular, section 304*b* may define a stub or wiper portion that is configured to contact an inside surface 308*a* of the sidewall 308. In some embodiments, sections 304*a* and 304*b* may be made from different materials and/or different material compositions to impart different properties on each section. For example, section 304*b* may be more flexible and/or pliable than section 304*a*. Similarly, section 304*a* may have a greater stiffness than section 304*b*. Due to these properties, section 304*b* is configured to deform to conform to the size of the housing. In some cases, the contact between section 304*b* and the sidewall 308 may create a waterproof or water-resistant interface that helps prevent water ingress and other contaminants from entering the cavity of the housing.

Figure 4:
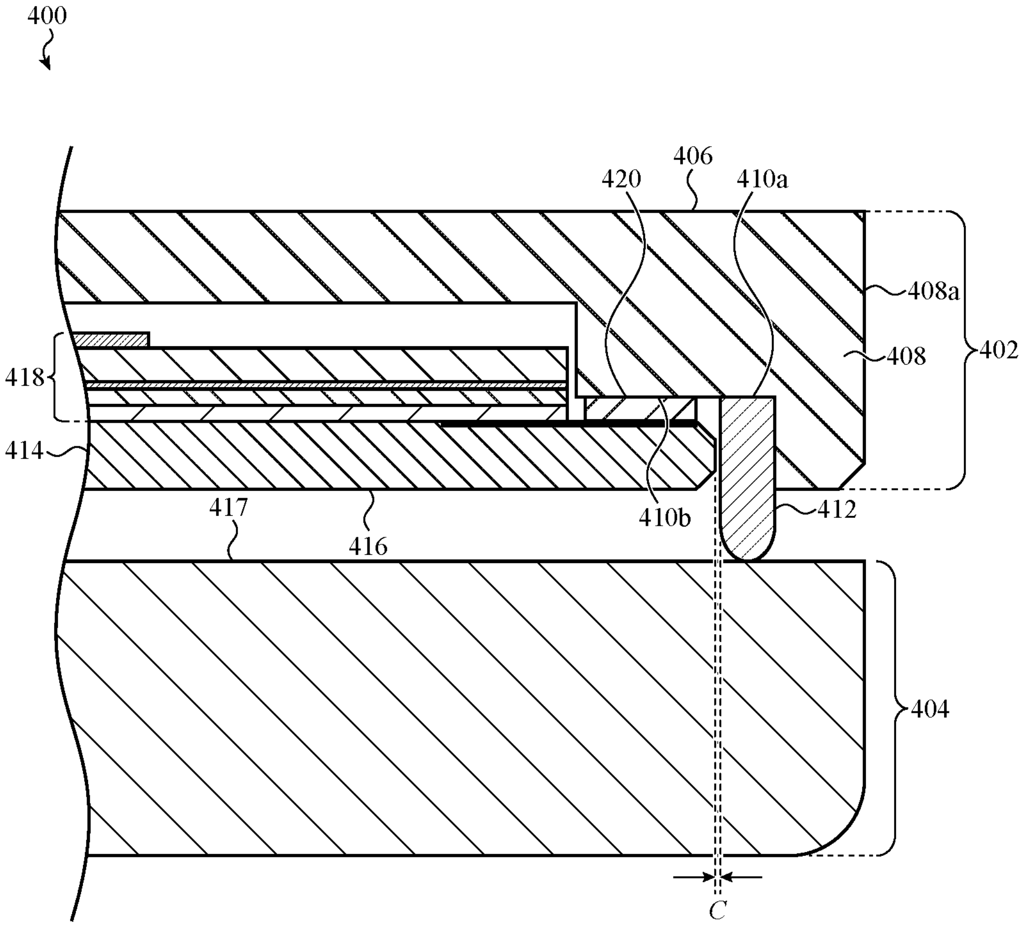
FIG. 4 depicts a partial cross-sectional view of an example electronic device in a closed configuration.

While FIGS. 2A-3D illustrate examples where the trim member is coupled to the cover, in other cases the trim member is coupled to the housing of the display portion of the electronic device. FIG. 4 presents an example of a device in which the trim member is coupled to a display housing.

More specifically, FIG. 4 is a cross-sectional view of an electronic device, such as a laptop, a notebook, or other foldable electronic devices, in a closed configuration. Similar to devices 200*a*-200*d* above, the electronic device 400 may include a display portion 402 and a base portion 404. The display portion may have a housing 406 that may include a sidewall 408 which defines a side surface 408*a* of the device. The housing 406 may further define an interior surface (e.g., interior surfaces 410*a* and 410*b*). In some cases, the interior surface has a stepped profile to accommodate members and/or different electronic components with the housing 406. For example, surface 410*a* may be coupled to trim member 412 while surface 410*b* may be coupled to a cover 414.

The trim member 412 may be overmolded over a portion of the inside of the housing 406. In some cases, the trim member is coupled to surface 410*a* and/or to a portion of the sidewall 408 (e.g., along an inside surface of the sidewall). The trim member 412 may protrude from a display surface 416 of the cover 414 (and of the display portion 402) and may be configured to contact a user interface surface 417 of the base portion 404 in a closed configuration. As explained above, this protrusion creates a cushion between the cover 414 and other surfaces that may protect the cover and other display components 418 from impact and/or failure (e.g., the protrusion creates a separation between the display surface and the user interface surface in a closed configuration). A clearance C is defined between the trim member 412 and the cover 414. For example, the trim member 412 and the cover 414 may not contact each other.

Similar to the benefits described as to FIGS. 2A-2D, by overmolding the trim member directly onto the housing 406, a distance between the cover 414 and the sidewall 408 may be reduced as compared to implementations with a pre-formed plastic member inserted between this space. In addition, overmolding the trim member 412 to the housing 406 allows various processes to be implemented, including overmolding using high pressure and temperature and/or overmolding using a LIPO process. For example, the housing may be formed from a material that can withstand higher temperatures and pressures than that of a display cover, such as metal, various different molding process may be implemented without causing damage to the housing.

As a result of this configuration where the trim member is coupled to the housing, the cover 414 may be coupled to the housing 406 via an adhesive 420. The adhesive 420 may be positioned at surface 410*b*. In some cases, the cover 414 extends beyond the periphery of the display components 418 to couple to the housing 406.

Figure 5:
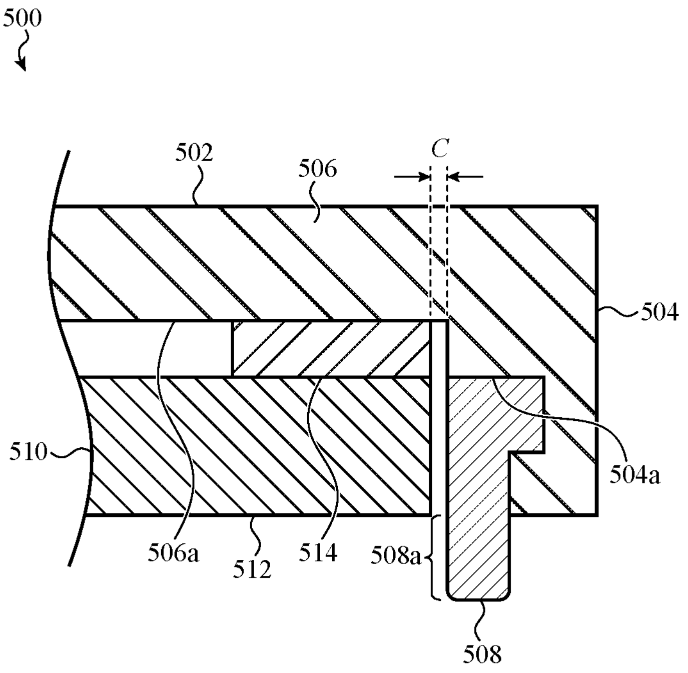
FIG. 5 depicts a partial cross-sectional view of an example display portion of an electronic device.

In some examples, the housing defines different profiles to increase the surface area and/or improve the engagement strength between the trim member and the sidewall of the housing and/or of the housing in general. FIG. 5 presents an example form factor of this geometry. Other geometries which increase the surface area and/or improve the bonding strength between these components are also envisioned.

FIG. 5 shows a cross-sectional view of a trim member coupled along a display portion of an electronic device. As depicted, the device 500 may include a housing 502 defining a sidewall 504 and a top structure 506. The sidewall 504 may define an interior side profile 504*a* having a recess or cavity. A trim member 508 may fill the recess or cavity along the inside side profile 504*a*. The trim member may also be coupled along a portion of the inside side profile 504*a* towards the display surface 512 of a cover 510. As explained above, a portion 508*a* of the trim member 508 may protrude from the display surface 512 and contact the base portion (e.g., the base portion 404 in FIG. 4) in the closed position. As described above, in this configuration, the trim member 508 and a peripheral side surface of the cover 510 may define a clearance C. This clearance may aid in the insertion of the cover and display assembly during device assembly, while also being smaller than the clearance that would be present if a separate trim piece were used, as described herein.

The cover 510 may be coupled to the top structure 506 of the housing 502. More specifically, the cover 510 may be coupled to an inside surface 506*a* of the top structure 506 via an adhesive 514. In some embodiments, display components are coupled to the top structure, thereby securing the display assembly within, or at least partially within, the housing 502.

Figure 6A:
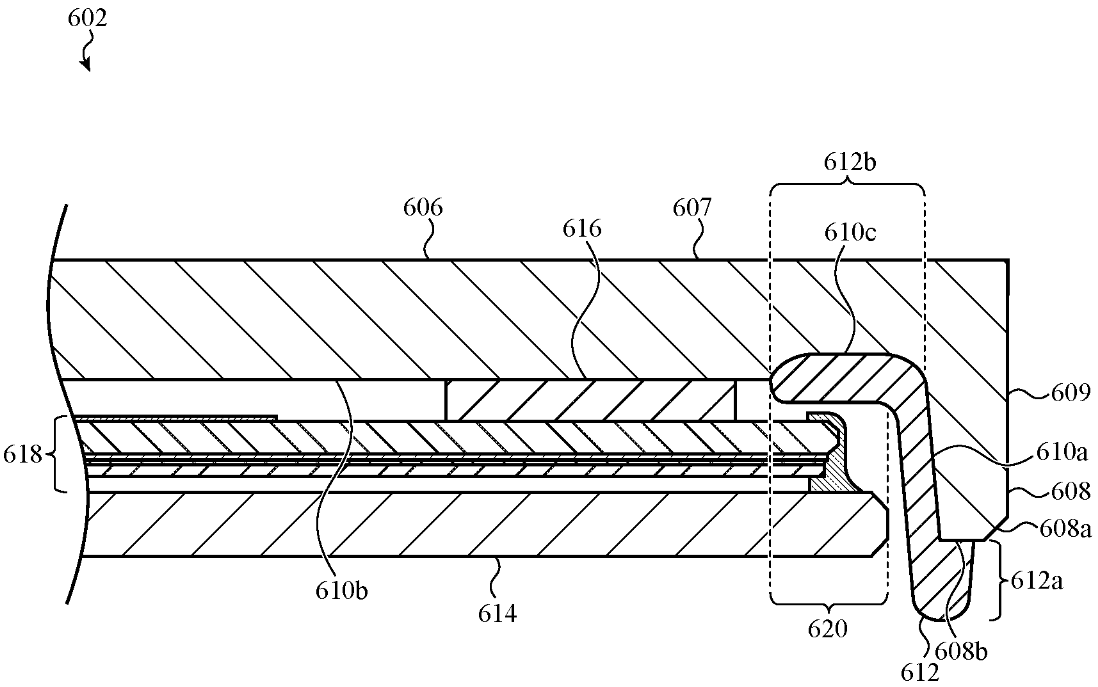
FIGS. 6A-6B depict a partial cross-sectional view of an example display portion of an electronic device.

FIG. 6A shows a cross-sectional view of a display portion 602 of an electronic device, such as a laptop. In this example, the trim member 612 covers a larger portion of an inside surface of the housing 606 compared to the examples presented in FIGS. 4 and 5. This configuration provides more surface area for the trim member 612 to adhere to, thereby improving the reliability and bond strength between the housing 606 and the trim member 612.

As depicted, the housing 606 may include a sidewall 608 which defines a side interior 610*a*. The housing 606 may also include a cross-member 607 coupled to the wall. The cross-member 607 defines a substantial portion of the housing 606 and a bottom portion of the inside surface 610*b*, along which a display stack 618 and cover a 614 are positioned. The trim member 612 may be positioned along the side interior surface 610*a* (defined by sidewall 608) and along a bottom portion of the inside surface 610*b* (defined by the cross-member 607). In some cases, the bottom portion of the inside surface 610*b* may define a recessed portion 612*b* or a depression, which the trim member 612 fills, thereby improving the adhesion surface area between the housing 606 and the trim member 612. In some embodiments, the trim member 612 bulges outward of the inside surface 610*b* (e.g., due to the overmolding process, liquid resin may first fill the recessed portion 612*b* before flowing towards the periphery of the housing 606).

The trim member 612 may define a protruding portion 612*a*. The protruding portion 612*a* extends from a front-facing surface 608*b* of the sidewall 608 (e.g., may be perpendicular to inside surface 610*a*). The front-facing surface 608*b* may define a lateral surface or a portion of a display surface of the device. The front-facing surface 608*b* may be positioned between the side interior surface 610*a* and the external surface 609 of the sidewall 608. The sidewall 608 may include a chamfer or a transition surface 608*a*. The transition surface 608*a* provides a smooth transition between an outside-facing or external surface 609 of the sidewall 608 and the protruding portion 612*a* of the trim member 612. In addition, the transition surface 608*a* provides an offset from the external surface 609 and the protruding portion 612*a* of the trim member 612*a*, which may ensure that no part of the trim member 612 extends externally from the side of the device when the device is in a closed configuration.

More generally, the front-facing surface 608*b*, the side interior surface 610*a*, the bottom portion of the inside surface 610*b*, and other recesses and depressions may be referred to as a peripheral mounting surface of the housing 606. The peripheral mounting surface may include other shelves or features for mounting the display assembly or other components within the display portion.

In some cases, the trim member 612 is configured as a protective member for the display assembly inside of the housing. For example, a portion of the display stack 618 may be coupled to the housing 606 at the inside surface 610*a-b* via an adhesive 616. The adhesive 616 may be coupled to the display stack 618 inward of the trim member 612. A periphery of the display stack 618 may be unbonded and may partially hover above the bottom interior surface 610*b*, thereby defining a clearance between a bottom portion of the trim member 612*b* and the innermost portion of the display stack 618. This clearance may be in the order of 0.1 mm-0.2 mm, 0.1 mm-0.5 mm, 0.1 mm-1 mm, 0.2 mm-0.5 mm, 0.2 mm-1 mm, or the like, and may be achievable due to the overmolding process of the trim member 612 (e.g., compared to a pre-formed rubber member which may require more space for installation). In some cases, this clearance from the display stack 618 to the trim member 612 at the inside surface 610*b* spans over an overlapping distance 620. In this configuration, when a force is applied to the cover 614 (e.g., by a user or other objects pressing on the cover), the display stack is protected from hard surfaces of the housing 606 by the trim member 612. For example, as the cover 614 and the display stack 618 deforms or moves towards the trim member 612, due to pressing of the cover, the trim member 612 provides a cushion or damage protection to the cover 614 and to the display stack 618.

Figure 6B:
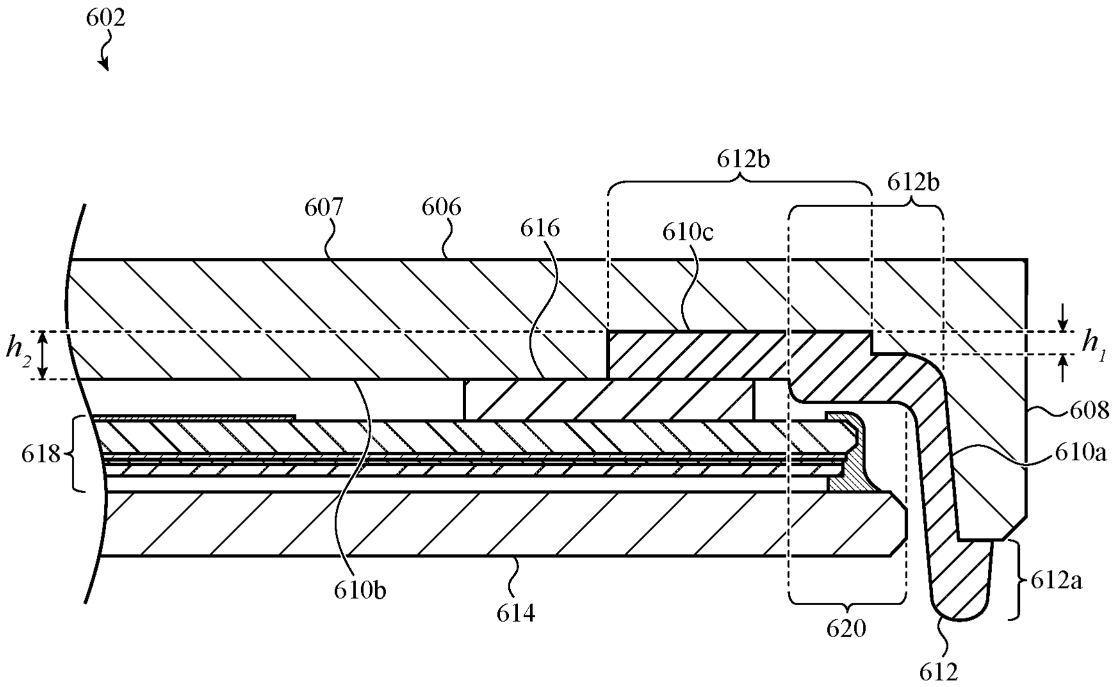

FIG. 6B shows a cross-sectional view of a display portion 602 of an electronic device, such as a laptop. This view may correspond to a different region along the display portion 602 compared to the cross section shown in FIG. 6A. In this view, the housing 606 may define a recess 610*c*, which is depressed with respect to the bottom portion of the inside surface 610*b*. The recess 610*c* may be used as an injection region to form the trim member 612. During the overmolding process, a liquid resin may be injected at the recess 610*c*, which fills the recess 610*c*. The liquid resin may then flow towards the sidewall 608, thereby covering a region of the bottom portion of the inside surface 610*b* and the entire portion of the side interior surface 610*a*, and continuing to flow to form the protruding portion 612*a* of the trim member.

In some cases, the inside portions of the housing 606 may be stepped to direct the flow of the liquid resin to form the trim member 612. In particular, the recess 610*c* may have a varying height such that flow is redirected towards portions with lower relative height with respect to the bottom of the recess. For example, the recess 610*c* may have a first height h1 with respect to a side of the recess 610*c* that is towards the sidewall 608 (e.g., portion that is towards the recessed portion 612*b*). The recess 610*c* may have a second height h2 towards an inward portion of the bottom surface 610*b*. The height h2 may be larger than the height h1, and thus the liquid resin, when injected, flows towards the sidewall 608 and outwards of the display portion, thereby forming the trim member 612. Once solidified, the injection region forms a portion of the trim member 612 that fills the recess 610*c*. This region increases the surface area of the trim member 612 that is bonded to the housing 606, thereby improving the overall bonding strength of the trim member. At this region, a portion of the display stack 618 may be coupled to a portion of the trim member 612 via an adhesive 616.

More generally, the trim member 612 may be formed over the housing 606 via an overmolding process, such as a low injection pressure overmolding process. Specifically, the trim member 612 may be formed from one or more thermoplastic materials or a combination of materials, such as liquid silicone rubber, epoxy, polyurethane, elastomers, other thermoplastics, or other similar materials. In some cases, the trim member may be formed from a composite of multiple materials and/or may include a fill material that is dispersed within the trim member 612. In some cases, the trim member 612 is formed from a material with a certain viscosity range in an uncured or liquid state which allows the material to flow and fill portions of the housing to form the trim member. In some cases, materials which require higher temperatures and pressures may be employed due to the material of the housing 606.

Figure 6C:
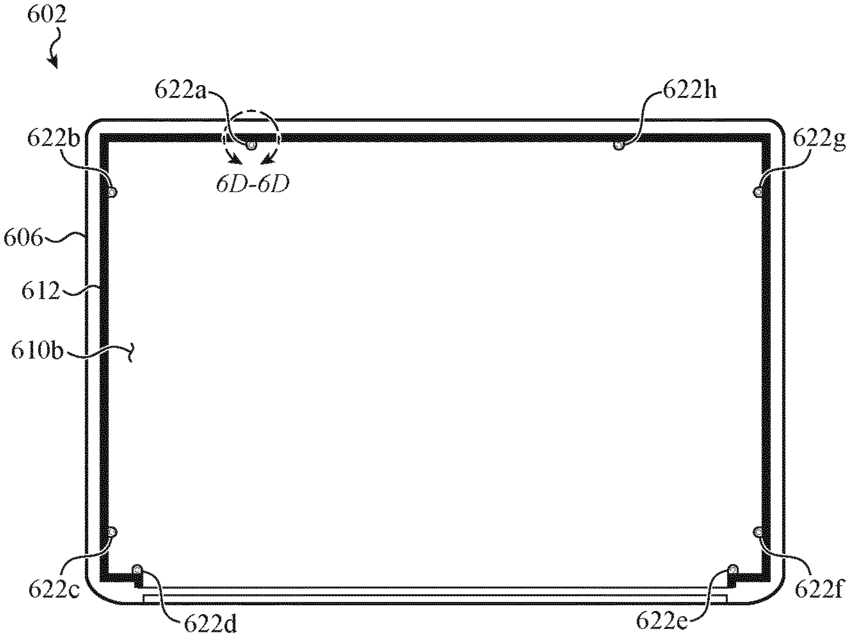
FIG. 6C depicts a plan view of an example display portion of an electronic device.
Figure 6D:
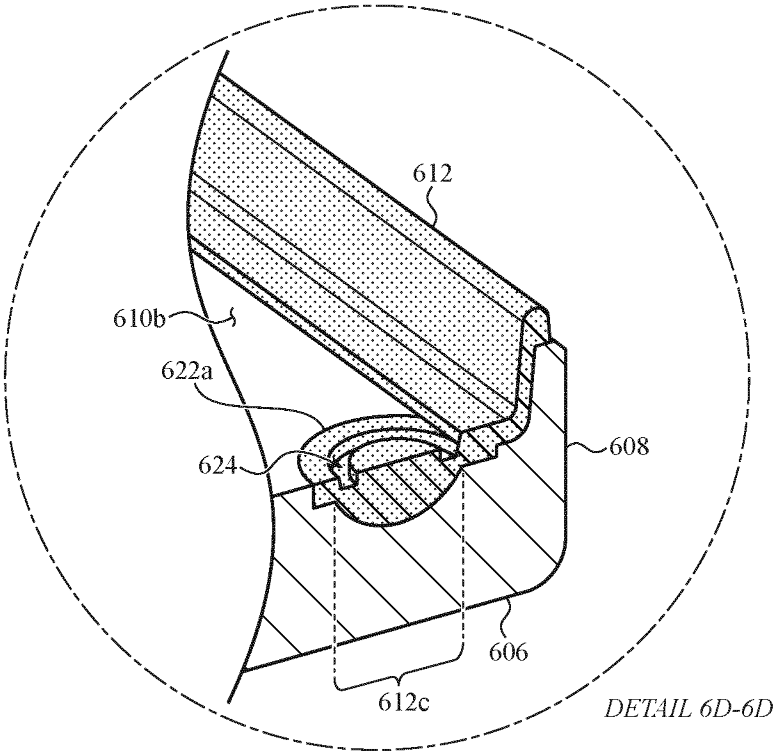
FIG. 6D depicts a detail view of an example display portion of an electronic device.

FIG. 6C shows a bottom view (display side) of a display portion 602 of a device. FIG. 6D shows a detail view 6D-6D of an injection region. This view is provided to show an example positioning of the injection regions along the perimeter of the display portion 602. As depicted in FIG. 6C, the trim member 612 partially surrounds a peripheral portion of a display cover and of a display housing. In particular, the trim member 612 defines a bumper or interface between a lip of the housing (shown in FIGS. 6A and 6B as a sidewall) and an edge of the cover of the display. To form the trim member, different injection regions 622*a-h* are used. In some cases, multiple injection regions helps form a uniform trim member (e.g., cured uniformly) and/or may streamline the manufacturing process. While eight injection regions are shown, this number is merely exemplary. The number of injection regions may depend on the size of the device, size of the housing, size of the trim member, and materials used.

As depicted in FIG. 6D, detail 6D-6D, the housing portion 606 at each injection region may define a recess 610*c*. In some cases, the cavity has a varying height such that liquid resin can first fill the cavity and flow outwards towards the sidewall 608 to form the trim member. In the example shown, the injection region 622*a* defines a substantially circular cross-section. In some examples, the cross-section of the injection region 622*a* may be based on the machinery and/or tooling used during the injection molding process. One or more grooves 624 may be formed as a result of this manufacturing process.

Figure 7A:
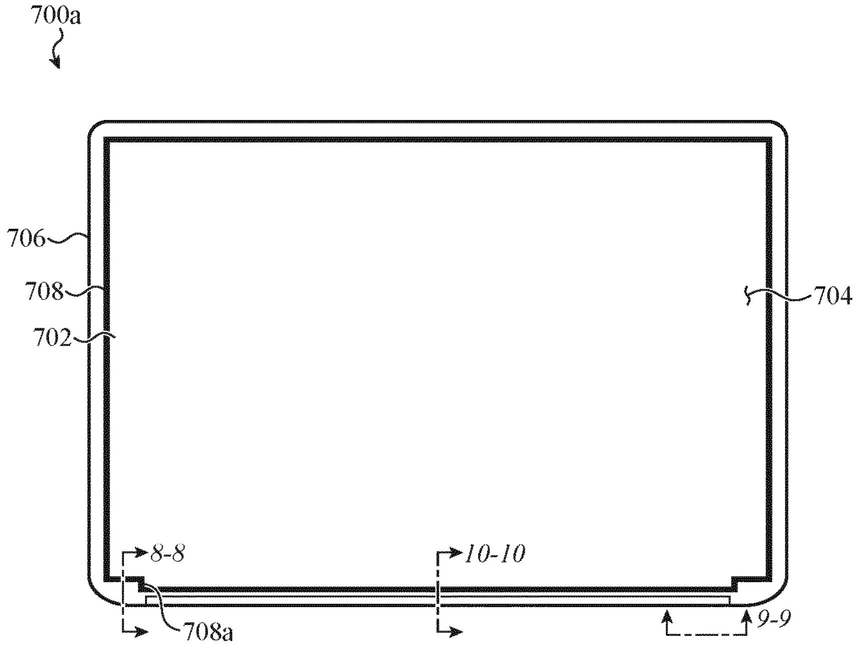
FIG. 7A-7B depict plan views of example display portions of an electronic device.
Figure 7B:
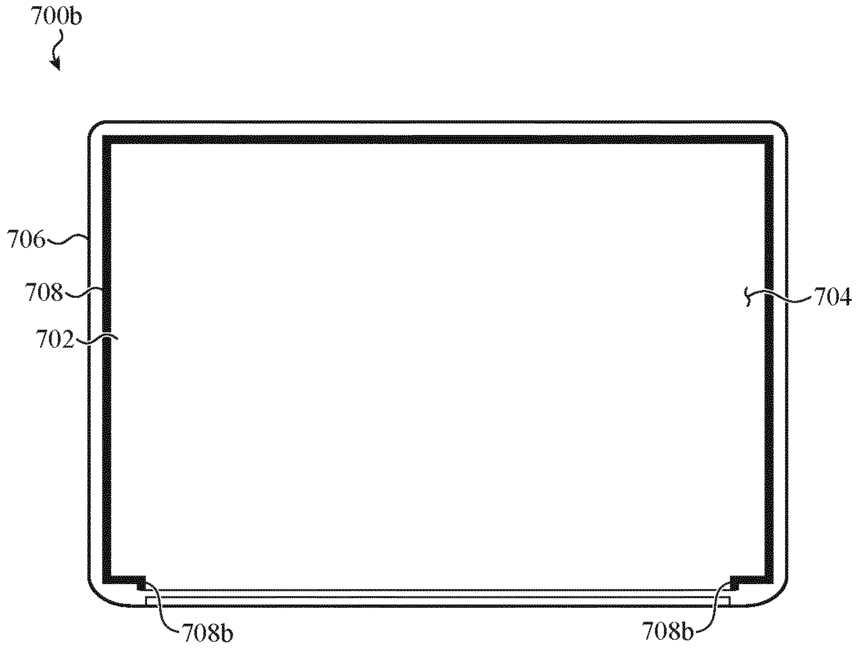

As described above, the trim member may surround or at least partially surround the periphery of the cover. FIGS. 7A-7B depict examples of the border of the trim member. FIG. 7A shows a plan view of a display portion 700*a* of the electronic device (e.g., electronic device 100) along the display surface of the electronic device. The cover 702 may define the display surface 704 of the electronic device and may define the majority of the surface area of the front of the display portion. The housing 706 may surround or at least partially surround the cover 702 and may define an outside-most peripheral surface of the electronic device. The trim member 708 may be disposed between the cover 702 and the housing 706. As depicted in FIG. 7A, the cover 702 may define a peripheral surface and the trim member 708 may be disposed around the peripheral surface of the cover. In some cases, the trim member 708 surrounds the entire periphery of the cover 702. In other words, the trim member 708 may define a closed perimeter around the display surface of the electronic device.

In some cases, the trim member 708 may conform to various peripheral profiles, such as 708*a* of the cover 702 or of the housing 706. For example, at 708*a*, the perimeter of the cover 702 steps downward towards the bottom of the device. Using the overmolding process, the trim member 708 may be able to accommodate differing and/or irregular geometries (e.g., 708*a*), as depicted in the figure. In some cases, the trim member 708 defines a continuous, single loop.

FIG. 7B shows a plan view of a display portion 700*b* of the electronic device (e.g., electronic device 100) along the display surface of the electronic device. In this embodiment, the trim member 708 is positioned, at least partially, between the cover 702 and the housing 706. In contrast to the example in FIG. 7A, the trim member 708 in FIG. 7B does not surround the entire periphery of the cover 702, but rather may terminate at ends 708*b*. In some examples, ends 708*b* may be located at a bottom region of the display portion (e.g., adjacent to where the display portion and the base portion are coupled). In this configuration, the cover and associated display components may still be protected from impact from the base portion due to the trim member positioned over the left, right, and top sides of the cover, viewed with respect to the page.

Figure 8:
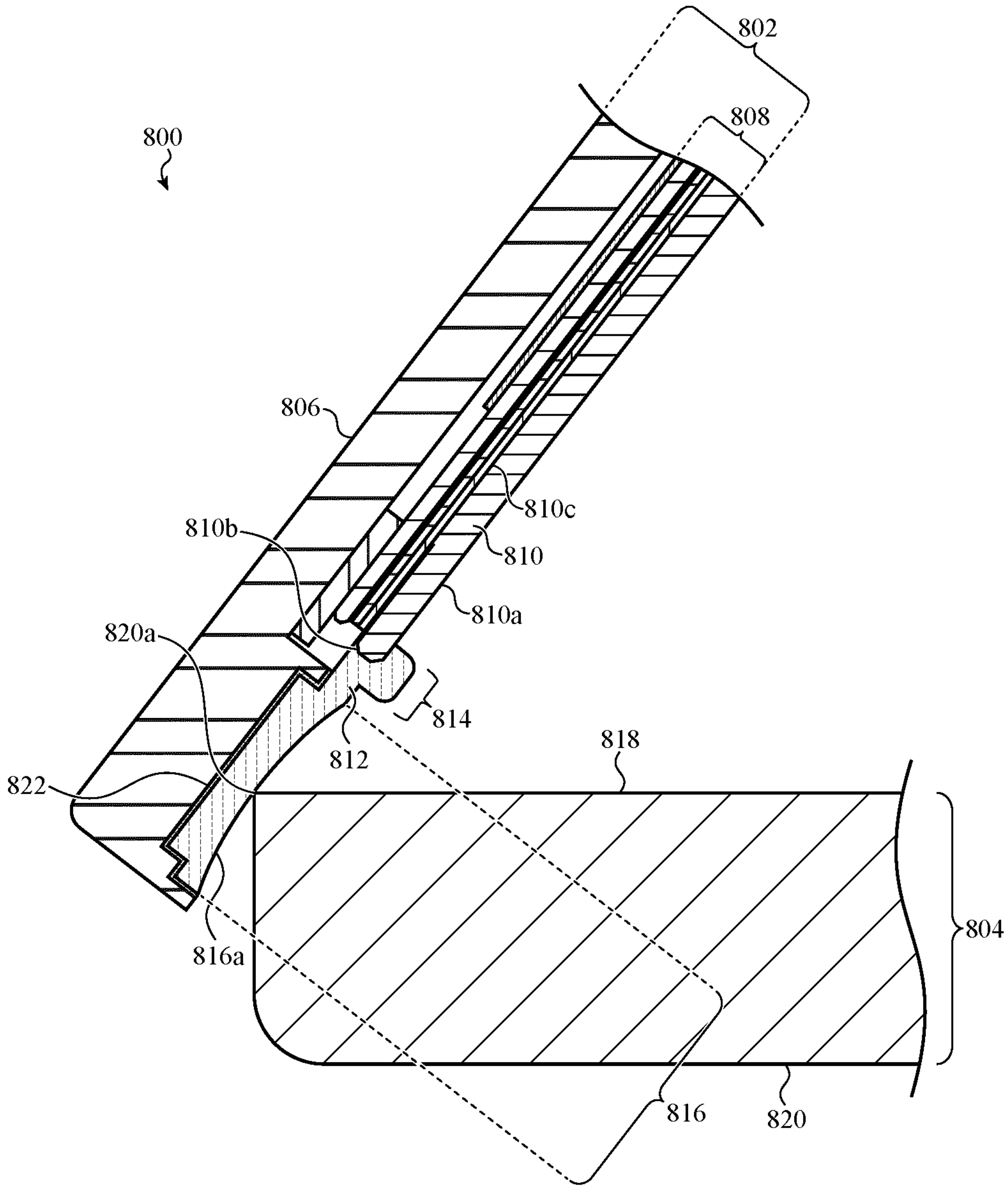
FIG. 8 depicts a partial cross-sectional view of an example electronic device including a trim member in a partially open position.

In some embodiments, the trim member extends beyond the gap between the cover and the sidewall of the housing and enclosure and defines a barrier portion of the electronic device. The barrier portion may be used as a wiper that clears the base portion yet allows for a smaller clearance between the display portion and the base portion when the device is opened. FIG. 8 shows a cross-sectional view of the electronic device 800 along line 8-8 of FIG. 7A. The device 800 is presented in a partially open position.

Device 800 may include a display portion 802 and a base portion 804. The display portion 802 may include a housing 806 that, at least partially, encloses electronic components. For example, the housing 806 may partially enclose a display assembly 808 and/or other electronic components. The display assembly 808, in turn, includes a cover 810 (e.g., such as a cover glass for a display) which defines a display surface 810*a* of the device (e.g., a front surface of the display portion in an open position).

Figure 9:
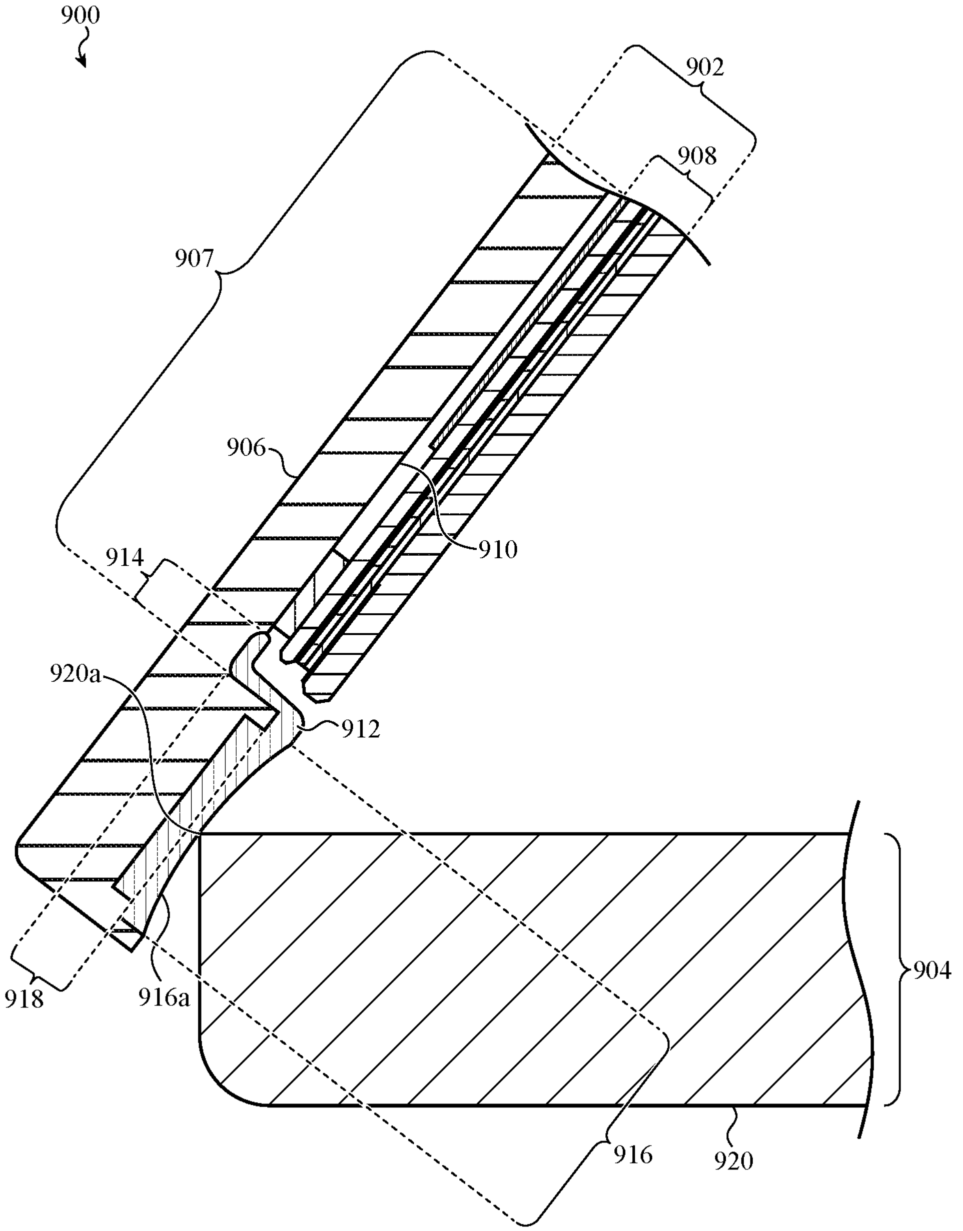
FIG. 9 depicts a partial cross-sectional view of an example electronic device including a trim member in a partially open position.

In some embodiments, the display portion 802 includes a trim member 812. The trim member 812 may include a display trim portion 814 and a barrier portion 816. The display trim portion 814 and the barrier portion 816 may be a monolithic structure. For example, the trim member may be overmolded over the cover 810 (FIG. 8) or over the housing 806 (FIG. 9).

As shown in FIG. 8, the display trim portion 814 may be coupled to the cover 810 at a peripheral region of the cover 810. For example, the display trim portion 814 may be coupled to the cover 810 at a peripheral side surface 810*b*, a portion of the display surface 810*a*, and/or a back surface 810*c* that is opposite the display surface 810*a*. The display trim portion 814 may protrude from the display surface 810*a* and may be configured to contact a user interface surface 818 of the base portion 804 in a closed position. In this configuration, the display trim portion 814 acts as a cushion or bumper to the cover 810 and to the display assembly.

The trim member 812 may also include a barrier portion 816. The barrier portion 816 may extend from the display trim portion 814 towards a periphery of the housing 806. The barrier portion 816 may be a concave shape configured to clear a corner portion 820*a* of a bottom housing 820 when the device is being opened. In other words, the barrier portion 816 may define a clearance recess that clears contact with the base portion when the device is opened. More specifically, as the device 800 goes from a closed to an open (or a partially open) position, the barrier portion 816 pivots close to the corner portion 820*a* of the bottom housing 820. In some cases, the bottom housing 820 is made from a metal, glass, or other materials or combination of materials. The trim member 812 and/or the barrier portion 816 maybe formed from or include a softer material than the housing 806, such as an epoxy, phenolic, diallyl phthalate and other thermoset materials, thermoplastic elastomer, thermoplastic polyurethane, thermoplastic rubber, silicone, polypropylene, polyoxymethylene, acrylic, polybutylene terephthalate, polyetherimide, polyethylene, polycarbonate, polyamide, polyester ether ketone, high-density polyethylene, acrylonitrile butadiene styrene, or any other materials or combinations of materials. As a result of this configuration, when the user opens the device 800 the barrier portion clear the corner yet, should contact be present, this contact may be imperceptible to the user. In turn, this configuration maintains a smaller separation between the display portion 802 and the base portion 804 which creates a more aesthetically pleasing device.

The barrier portion 816 may define a front surface 816*a*. The front surface 816*a* may be curved or concave, as depicted in the figure to accommodate the rotation of the display portion 802 against the base portion 804. For example, the front surface 816*a* defines a saddle-like profile, which dips between each end region of the barrier portion.

The display trim portion 814 and the barrier portion 816 may be coupled to the enclosure via an adhesive 822. The housing 806 may include features that accommodate the shape of the trim member 812. For example, as depicted, the barrier portion 816 as a shelf or stepped profile, which may increase the surface area that is bonded to the housing (e.g., compared to a flat surface) and thereby improve the bonding between the components. In some cases, the trim member 812 secures the display assembly 808 to the housing.

In other embodiments, as explained in FIGS. 4-6C, a trim member may be formed over and bonded to the housing. FIG. 9 shows a partial cross-sectional view of an example barrier portion with a trim member which are formed over the housing and bonded to the housing. In this example, a trim member 912 may include a barrier portion 916 and a trim portion. The trim portion may, in turn, include a bottom portion 914 and a side portion 918. Generally, the barrier portion 916 and the trim portion form a continuous, monolithic structure that is bonded to a periphery of the housing of a device 900 at the display portion 902. Similar to the device 800 described above, the barrier portion 916 is configured to pivot around and/or interface with a base portion 904 of the device 900 at corner 920*a* of the device 900. The corner 920*a* may be defined by the housing 920 of the base portion.

In some cases, the housing 906 includes a cross-member 907 or cross-portion, which defines a substantial portion of the housing. The cross-member 907 defines the inside surface 910 of the housing (also referred to as a bottom surface) and may define a recess which is filled by the bottom portion 914 of the trim member 912. Since the trim member 912 is overmolded around the housing 906, the trim member 912 is bonded to the inside surface 910 (at the recess), wraps around a side of the housing, and defines the barrier portion 916. The trim member 916 is generally configured to protect the display assembly 908 in case of movement and/or deformation and from contact with the base portion 904 in the closed position. The barrier portion 916 may be formed to include a concave surface 916*a* such that, during opening and closing of the device, a corner region 920*a* pivots about the display portion without contact. In some cases, the corner region 920*a* may partially deform the barrier portion 916. Due to the difference in hardness of the materials, this contact may be imperceptible to the user and may not damage and/or wear the device components.

In some cases, prior to applying the trim member 912 to the housing 906, a primer may be used to prepare the surface. The housing may include additional features (e.g., cavities, depressions, notches, and so on) that act as an interlock to the trim member, the surface of the housing may have a rough or textured surface to aid in the bonding of the trim member, and so on.

In some examples, the device may include multiple barrier portions 916 that may be on either side of the central hinge region of the device (see, e.g., central hinge region 106 in FIG. 1A).

Figure 10:
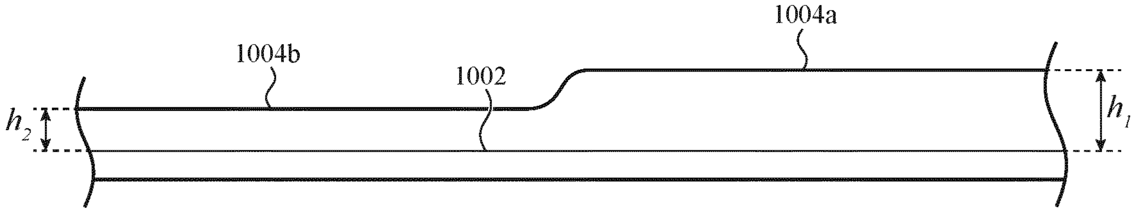
FIG. 10 depicts a portion of an example trim member of an electronic device.

In some cases, a height of the trim member protruding from the display surface varies along the periphery of a display cover. For example, along a hinge portion of the device, the height of the trim member may be adjusted to prevent clashing during opening and/or closing of the device. Similarly, a base portion of the device may include protruding buttons or displays which may require additional clearance, thereby benefitting from the variable height. FIG. 10 shows an elevation view of the trim member, viewed along line 10-10 of FIG. 7A. More specifically, the protruding height of the trim member 1004*a-b* with respect to the display surface 1002 may be different depending on the location along the periphery of the cover, for example. The trim member 1004 may include a first portion 1004*a* having a height $h_1$ measured with respect to the display surface 1002. The trim member 1004 may also include a second portion 1004*b* having a height $h_2$ with respect to the display surface 1002 that is less than height $h_1$. These transitions in height may be positioned along a bottom end of the display portion (e.g., close to the pivot axis of the device). For example, a first span of the trim member may be defined over a first portion of the peripheral side surface of the cover and a second span of the trim member may be defines over a second portion of the peripheral side surface of the cover. In other embodiments, a taller region (e.g., portion 1004*a* with height $h_1$) may be positioned at the corners of the device to protect the cover in areas likely to receive higher impacts. In yet another example, the trim member may define a trim member pattern (e.g., waved, stepped, jagged, and so on) of the protruding portion. In some cases, the trim member may have an elevated height at the corner of the base portion in relation to the sides of the display portion. As another example, the trim member may have an elevated height along the sides of the display portion and a lower height at the corners of the display portion. As yet another example, the trim member may have an elevated height along the top region of the display portion and a lower height along the hinge region of the display portion. In other cases, the trim member may define an inclined profile. For example, the trim member may have a higher height at one end and define a slope downwards towards a second end.

Figure 11:
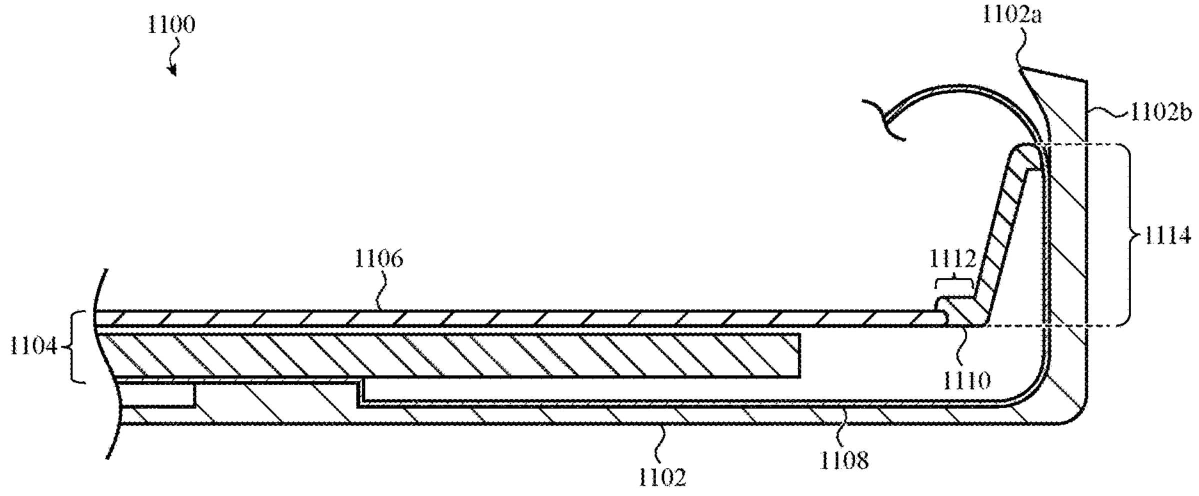
FIG. 11 depicts a partial cross-sectional view of an example display portion of an electronic device.

Similar to FIG. 10, the trim member may be extended beyond the display trim portion to define other regions that perform other functions, such as occluding electronic components from view or protecting electronic components from clashing, contact, or other contaminants. For example, FIG. 11 shows a cross-sectional view of the display portion 1100 along line 11-11 of FIG. 7A. In this figure, the housing 1102 is shown at the central hinge region of the device (e.g., central hinge region 106 of FIG. 1A) facing upwards (screen-side up). As depicted, the housing 1102 may at least partially enclose display assembly 1104. The display assembly 1104 may define a display surface 1106. For example, the display assembly may include a cover that defines display surface 1106. In some cases, the device includes a flexible circuit element 1108 (or other component) which extends from a portion of the housing 1102 to the base portion of the device and conductively couples components of the display portion to components of the base portion (e.g., a battery, circuit board, processor, etc.).

In some embodiments, the display portion 1100 includes a trim member 1110. The trim member 1110 may have a display trim portion 1112 and a gasket portion 1114. The display trim portion 1112 and the gasket portion 1114 may be a monolithic piece. More specifically, the display trim portion 1112 may be the portion of the trim member 1110 that couples to the display assembly 1104. The display trim portion 1112 may protrude from the display surface 1106, thereby protecting the display assembly from contact with base portion and occluding and/or protecting underlying components of the display portion (e.g., flexible circuit elements).

The trim member 1110 may include a gasket portion 1114 which extends from the display trim portion 1112 to an end portion 1102*a* of the housing 1102. In this embodiment, the gasket portion 1114 may extend along the sidewall 1102*b* of the enclosure. The flexible circuit element 1108 may be positioned between the housing 1102 and the gasket portion 1114. Due to this configuration, the gasket portion 1114 may occlude the flexible circuit element 1108 from view. The display trim portion 1112 and the gasket portion 1114 may be formed using an overmolding process which may reduce the number of parts and/or assembly needed to make the device. While the figure presents an embodiment where the trim member 1110 is coupled to the display assembly 1104, in other embodiments, the trim member 1110 may be molded to the housing 1102 (e.g., as shown in FIG. 4).

Figure 12A:
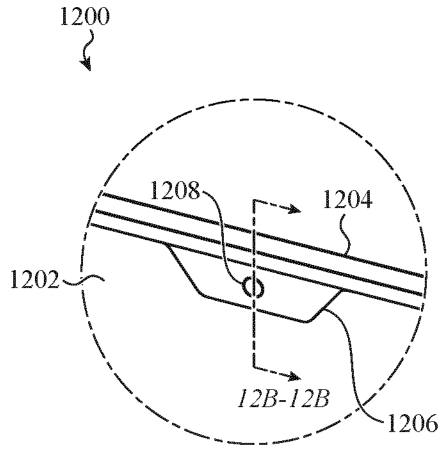
FIG. 12A depicts a camera region of an example display portion of an electronic device.

In some examples, the geometry and/or extent of the trim member may be expanded to accommodate mounting of other electronic components of the device, such as cameras, speakers, microphones, and so on. FIG. 12A depicts a detail view of an area of a display portion (e.g., corresponding to area 12A-12A in FIG. 1) that includes a front-facing camera region that is defined in part by an extended trim area. As shown in FIG. 12A, the display portion 1200 may include a display cover 1202 which defines a display and/or front surface of the device in an open position. Electronic components of the display portion may be at least partially enclosed in a housing 1204. A trim member may define a camera region 1206 that includes at least one camera module 1208. The boundaries of camera region 1206 may be defined, at least partially, by a periphery of the cover.

Figure 12B:
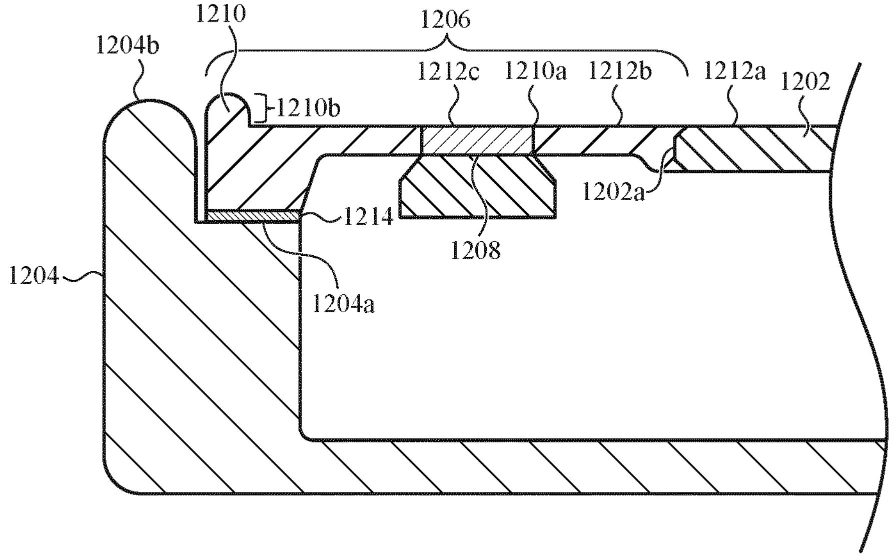
FIG. 12B depicts a partial cross-sectional view of the camera region of the display portion of FIG. 12A.

A trim member may define the camera region 1206. FIG. 12B depicts a cross-sectional view of the display portion along line 12B-12B of FIG. 12A. As depicted, a trim member 1210 may include a wall segment that defines the front-facing camera region 1206. In this configuration, the trim member 1210 may be overmolded over the cover and/or over the at least one camera module 1208 (or the camera module 1208 may be attached to the trim member 1210 after the trim member is formed). More specifically, the wall segment of the trim member 1210 may define a hole 1210*a* that extends through the wall segment of the trim member 1210. The camera module 1208 may extend at least partially through the opening. In an open configuration, the camera module 1208 may be configured to face the user (e.g., for videoconferencing, pictures, and so on). In some cases, a window may be positioned within the hole 1210*a* may cover the camera module. In addition, the trim member may be coupled to the cover at the peripheral side surface 1202*a* and may extend at least partially over a surface of the cover opposite the front surface 1212*a*.

The trim member may extend to the housing 1204 and may be coupled to the housing 1204 via an adhesive 1214. For example, the housing 1204 may define a ledge 1204*a* where the trim member 1210 sits. As a result of this configuration, the cover 1202 may be secured to the housing 1204 via the trim member.

In some cases, the cover 1202, at least a portion of the trim member 1210, and a portion of the camera module 1208 may cooperate to define a front surface 1212*a-c* of the display portion. For example, the cover 1202 may define a first portion 1212*a* of the front surface, the trim member 1210 may define a second portion 1212*b* of the front surface, and the camera module may define a third portion 1212*c* of the front surface. In some cases, the first, second, and third portions of the front surface 1212*a-c* may be flush. In other examples, however, some surfaces may not be flush. For example, the camera module 1208 may protrude from the second portion 1212*b* of the front surface defined by the trim member 1210.

In some embodiments, the trim member 1210 may define a protruding portion 1210*b*. The protruding portion 1210*b* may protrude from the front surface 1212*b* and/or may protrude from the sidewall 1204*b* of the housing 1204. In this configuration, the protruding portion 1210*b* of the trim member acts as a cushion and/or a bumper of the display portion. More specifically, in the closed configuration, the protruding portion 1210*b* of the trim member helps maintain a separation between the cover and the base portion, thereby preventing impact and/or contact which may damage the display. Similarly, the trim member 1210 may prevent damage to the camera module. As one example, in embodiments where the camera module 1208 protrudes from the second portion 1212*b* of the front surface, the trim member 1210 may also act as a bumper to the camera module which prevents its contact with the base portion. As another benefit to this configuration, having the trim member as a unitary part that protects the cover, defines the camera region, and receives the camera module, the part count of the device may be reduced.

Figure 13:
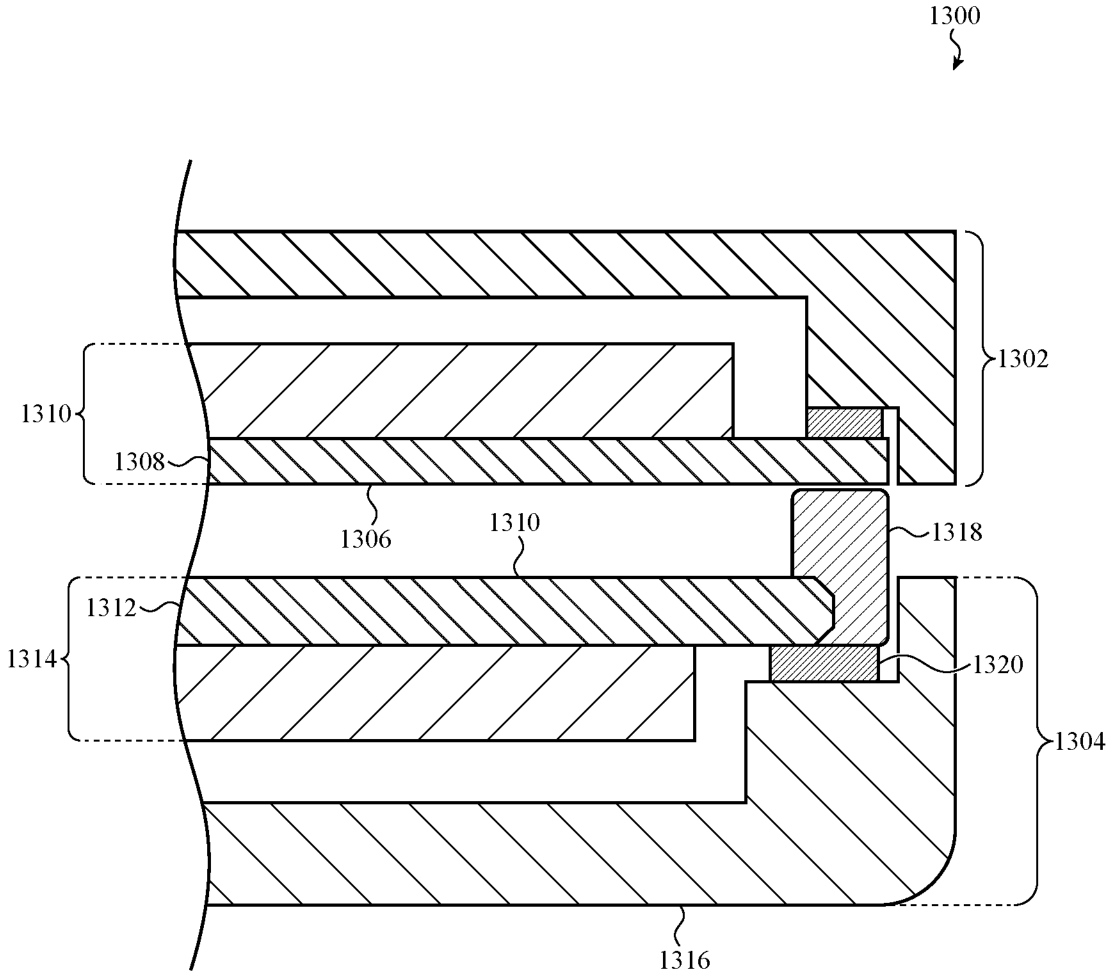
FIG. 13 depicts a partial cross-sectional view of an example electronic device in a closed configuration.

In some embodiments, the trim member may be positioned in the base portion of the device and it may be configured to contact the display surface of the display portion of the device. FIG. 13 shows a cross-sectional view of an electronic device (e.g., device 100 from FIG. 1A) in a closed configuration. As depicted, the device 1300 includes a display portion 1302 and a base portion 1304. The display portion 1302 may include a first display surface 1306 that may be defined by a display cover 1308 that defines an outside portion of a display assembly 1310. Unlike embodiments described above, the base portion 1304 of the device may include second display surface 1310. The second display surface 1310 may be defined by a cover 1312. The cover 1312 may be part of a display assembly 1314 of the base portion 1304 and may be positioned at least partially within a bottom housing 1316 of the base portion 1304. The second display surface 1310 may be a second display which covers a majority of the front surface of the device. The second display surface 1310 may be a display (e.g., OLED, LCD, and so on) with a touch screen. In some cases, the second display may act as a virtual keyboard, a virtual trackpad, and/or include other user interface features such as buttons, slides, and so on. This display may additional include haptic actuators that generate a haptic output in response to a user input.

In this configuration, a trim member 1318 may be coupled to the cover 1312 of the base portion 1304. For example, an overmolding process may be used to form the trim member 1318 over the cover 1312. The overmolding process and edge geometries described with respect to the trim member coupled to the cover apply as to the trim member coupled to the base cover and not repeated here for brevity. Each component may be bonded using a primer, other surface preparation techniques, and/or using interlocking features. The trim member 1318 may also be coupled to the housing 1316 via an adhesive 1320. The housing 1316 may include features, such as a ledge, that are configured to receive the trim member 1318. In some cases, coupling the trim member 1318 to the housing 1316 secured the cover and/or display assembly 1314 to the housing 1316.

The trim member 1318 may define a portion which protrudes from the second display surface 1310. At this protruding portion, the trim member 1318 may contact the first display surface 1306 when the device is closed, which creates a separation between both display surfaces, 1306 and 1310. Due to this configuration, both covers 1308 and 1312 may be protected from impact and/or contact between the portions of the device, similar to embodiments described above. In some embodiments, by eliminating the trim member from the display portion, the first display surface 1306 and/or side of the display assembly 1310 in the display portion 1302 of the device 1300 may be expanded.

In some cases, the upper member of the base portion may not be a transparent cover over a display, but may instead support and/or define a keyboard (e.g., a keyboard with movable keys) and a trackpad. In such cases, the upper member may be formed of metal, a polymer, a composite, or another material. The upper member may define one or more openings for keys, a keyboard, a trackpad, or other input devices. The trim member may be positioned between the upper member and the side wall housing of the base portion of the device. While the trim member need not protect the upper member, placing the trim member in the base portion of the device still protects the cover of the display portion (by preventing contact between the display surface and the base portion) without requiring a gap and/or clearance between the cover and the housing of the display portion. Accordingly, the display may be expanded without losing protection provided by the trim member.

Figure 14:
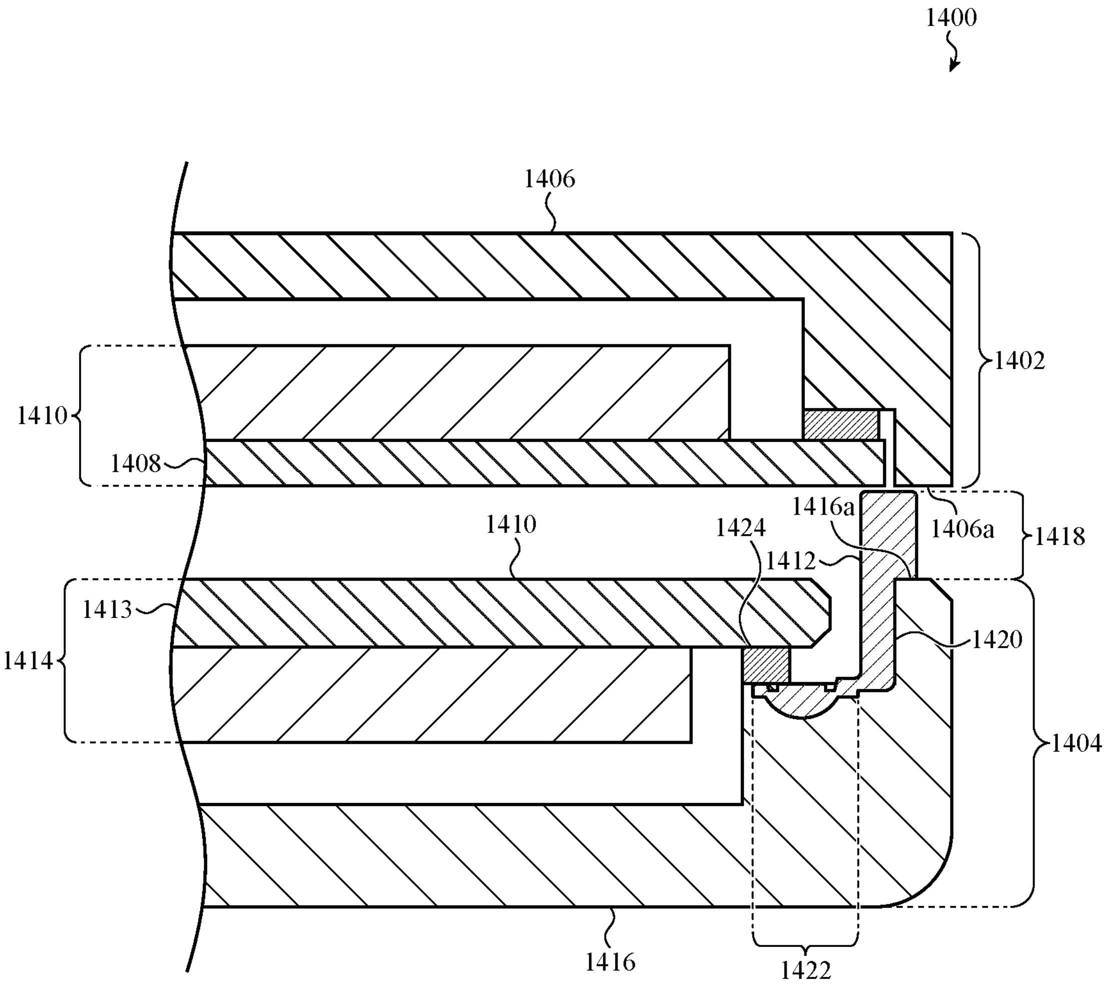
FIG. 14 depicts a partial cross-sectional view of an example electronic device in a closed configuration.

While FIG. 13 depicts the trim member 1318 coupled to cover 1312, in other configurations, the trim member may be formed over the housing and define a clearance with respect to the cover. The trim member is configured to protrude from the housing, thereby protecting the cover at the display portion and the cover than the base portion. FIG. 14 shows an example trim member that is bonded to the housing of the base portion. In this example, a trim member 1412 may wrap around an inside periphery of a housing 1416 of the base portion 1404 of the device 1400. Similar to FIG. 13, the trim member 1412 includes a protruding portion 1418 which protrudes from a front-facing surface 1416*a* of the housing 1416 (e.g., at the base portion 1404). The front-facing surface 1416*a* is defined as the region between the inside surface of the housing and the outside surface of the housing 1416, which faces the display cover 1408 and the display portion 902 in a closed configuration. In some configurations, the front-facing surface 1416*a* may define a chamfer or offset to reduce overlap of the trim member 1412 with respect to an outside surface of the device 1400.

In a closed configuration, the protruding portion 1418 may contact the display portion 1402 to ensure a gap that protects the display assembly 1410 and, in particular, the cover 1408 from impact and/or other contact with hard interfaces, like housings. In some cases, the protruding portion 1418 contacts both the cover 1408 and a front-facing surface 1406*a* of the housing 1406. The front-facing surface 1406*a* (at the display portion 902) defines a region between the inside surface of the housing 1406 and an outside surface of the housing which faces the base portion 1404 (e.g., a base assembly 1414, a keyboard 1413, or the like) in a closed configuration.

The trim member 1412 may be formed along a peripheral inside surface of the housing 1416, which may define one or more recesses and shelves that increase the contact surface area between the trim member 1412 and the housing 1416. The trim member 1412 may be formed using an overmolding process (e.g., low injection pressure overmolding process). The housing 1416 may include one or more features where liquid resin is injected. These injection regions 1422 are configured to pool the resin in the basin or recess defined by the housing before flowing towards the side portion 1420 and the protruding portion 1418. These injection regions 1422 may be located circumferentially along the periphery of the housing.

In some cases, the display assembly 1410 is coupled to the housing 1406 (e.g., an inside surface or shelf of the housing) via an adhesive. In some cases, the display portion docs not include a trim member and thus the display cover 1408 can extend within a larger area of the display portion 902. At the base portion 1404, the keyboard 1413 is coupled via an adhesive 1422 to an inside surface of the housing 1416 and/or to a portion of the trim member (e.g., an injection region 1422).

In some embodiments, a trim member may be formed along the display portion and/or the base portion of the housing and secure other functional components of the device to the housing. For example, the device may include magnetic members that detachably maintains the device in a closed position. The trim member may be formed around one of more receptacles for these magnetic members to couple the magnetic member to the housing. FIGS. 15A-15D depict various embodiments of the magnetic members coupled to the housing via a trim member.

Figure 15A:
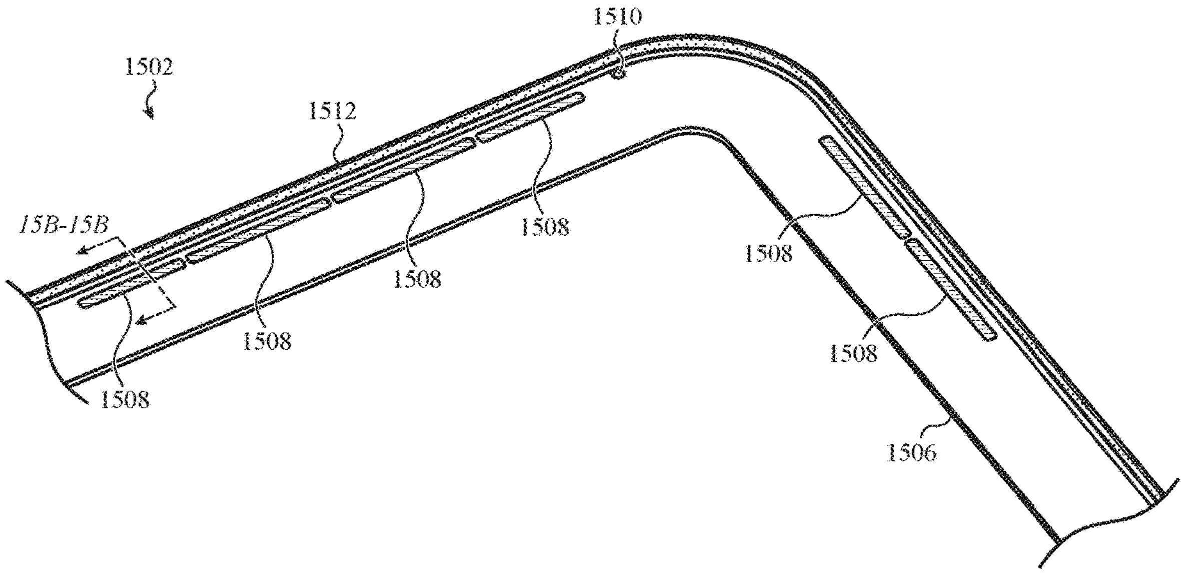
FIG. 15A depicts a partial perspective view of a display portion of an electronic device.

FIG. 15A depicts a partial perspective view of a display portion 1502. In this view, a display cover and display assembly is omitted for clarity. As depicted, a housing 1506 of the display portion 1502 may include a plurality of magnetic regions 1508 which are configured to detachably couple the display portion 1502 to a base portion in a closed configuration. Each magnetic region of the plurality of magnetic regions 1508 may be positioned along a periphery of the housing 1506, adjacent a trim member 1512. The trim member 1512 may the configurations described in FIGS. 6A-6D above and may include one or more injection regions 1510. Each magnetic region 1508 may include an overmolded polymer member which secures magnetic members to the magnetic region 1508.

Figure 15B:
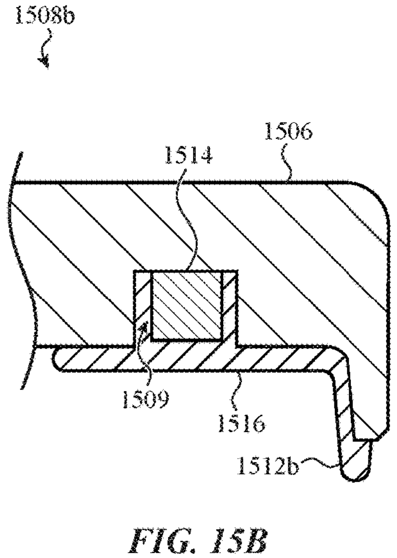
FIGS. 15B-15D depict a partial cross-sectional view of a magnetic region of the display portion of FIG. 15A.

FIG. 15B shows a partial cross-sectional view of a magnetic region 1508*b* along line 15B-15B of FIG. 15A. The housing 1506 may define a receptacle 1509 configured to accept a magnetic member 1514. In some cases, the magnetic member 1514 is fully inserted in the receptacle such that there is no protrusion with respect to the housing 1506. The trim member 1512*b* may extend contiguously from a protruding portion to the magnetic region. A portion 1516 of the trim member 1512 fills the receptacle 1509 and covers the magnetic member 1514, thereby securing the magnetic member 1514 to the housing 1506. In this configuration, no adhesives are needed to secure the magnetic member 1514 to the housing 1506. This configuration may also provide a more reliable coupling of the magnetic member 1514 through repeated open/close cycles of the device.

Figure 15C:
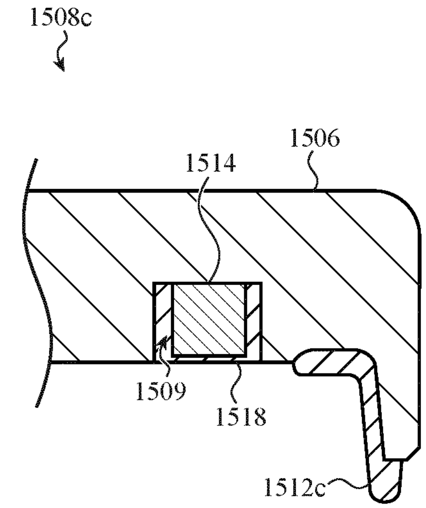

FIG. 15C shows another example of a cross-sectional view of a magnetic region 1508*c*. In this example, the trim member 1512*c* is not contiguous. A separate trim member or molded polymer member 1518 may be formed into the receptacle 1509, thereby securing the magnetic member 1514 to the housing 1506. The separate molded polymer member 1518 may be flush with a surface of the housing 1506. In some embodiments, the separate molded polymer member 1518 may protrude from the surface of housing 1506.

Figure 15D:
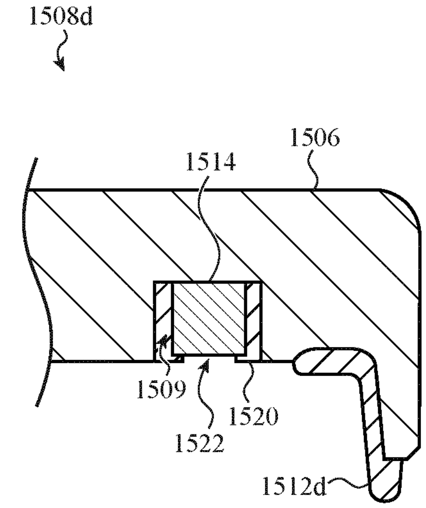

FIG. 15D shows another example of a cross-sectional view of a magnetic region 1508*d*. In this example, a separate molded polymer member 1520 defines an opening 1522, which partially exposes the magnetic member 1514. This configuration can provide a visual confirmation of the location of the magnetic member and/or improve the coupling strength exerted by the magnetic member 1514 to detachably couple the display portion to the base portion. In this configuration, the separate molded polymer member may be flush with respect to a surface of the housing 1506 facing the display and/or protrude from this surface. While the trim member 1512*d* is shown as separate from the molded polymer member 1520, in some embodiments, the trim member 1512*d* may be a monolithic piece that defines an opening 1522.

Figure 16:
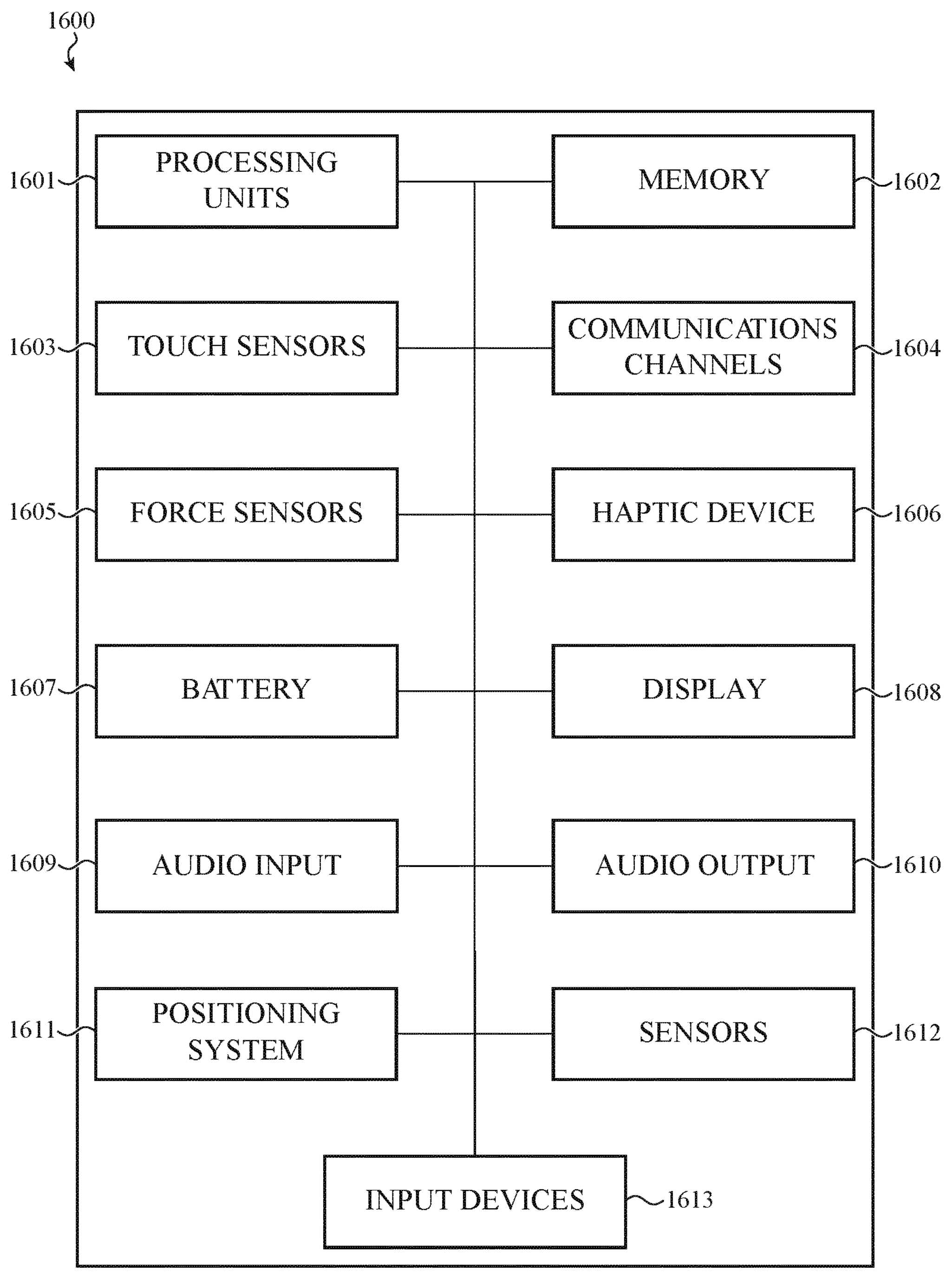
FIG. 16 depicts a schematic diagram of an example electronic device.

FIG. 16 depicts an example schematic diagram of an electronic device 1600. The electronic device 1600 may be an embodiment of or otherwise represent the device 100 (or other devices described herein). The device 1600 includes one or more processing units 1601 that are configured to access a memory 1602 having instructions stored thereon. The instructions or computer programs may be configured to perform one or more of the operations or functions described with respect to the electronic devices described herein. For example, the instructions may be configured to control or coordinate the operation of one or more displays 1608, one or more touch sensors 1603, one or more force sensors 1605, one or more communication channels 1604, one or more audio input systems 1609, one or more audio output systems 1610, one or more positioning systems 1611, one or more sensors 1612, and/or one or more haptic feedback devices 1606. Where the device 1600 is a notebook computer, the components and/or systems described with respect to FIG. 16 may be included in the base portion of the device (e.g., the base portion 104), the display portion of the device (e.g., the display portion 102), or distributed between the base portion and the display portion.

The processing units 1601 of FIG. 16 may be implemented as any electronic device capable of processing, receiving, or transmitting data or instructions. For example, the processing units 1601 may include one or more of: a microprocessor, a central processing unit (CPU), an application-specific integrated circuit (ASIC), a digital signal processor (DSP), or combinations of such devices. As described herein, the term "processor" is meant to encompass a single processor or processing unit, multiple processors, multiple processing units, or other suitably configured computing element or elements.

The memory 1602 can store electronic data that can be used by the device 1600. For example, a memory can store electrical data or content such as, for example, audio and video files, images, documents and applications, device settings and user preferences, programs, instructions, timing and control signals or data for the various modules, data structures or databases, and so on. The memory 1602 can be configured as any type of memory. By way of example only, the memory can be implemented as random access memory, read-only memory, Flash memory, removable memory, or other types of storage elements, or combinations of such devices.

The touch sensors 1603 may detect various types of touch-based inputs and generate signals or data that are able to be accessed using processor instructions. The touch sensors 1603 may use any suitable components and may rely on any suitable phenomena to detect physical inputs. For example, the touch sensors 1603 may be capacitive touch sensors, resistive touch sensors, acoustic wave sensors, or the like. The touch sensors 1603 may include any suitable components for detecting touch-based inputs and generating signals or data that are able to be accessed using processor instructions, including electrodes (e.g., electrode layers), physical components (e.g., substrates, spacing layers, structural supports, compressible elements, etc.), processors, circuitry, firmware, and the like. The touch sensors 1603 may be integrated with or otherwise configured to detect touch inputs applied to any portion of the device 1600. For example, the touch sensors 1603 may be configured to detect touch inputs applied to any portion of the device 1600 that includes a display (and may be integrated with a display), such as the display 103. The touch sensors 1603 may operate in conjunction with the force sensors 1605 to generate signals or data in response to touch inputs. A touch sensor or force sensor that is positioned over a display surface or otherwise integrated with a display may be referred to herein as a touch-sensitive display, force-sensitive display, or touchscreen.

The force sensors 1605 may detect various types of force-based inputs and generate signals or data that are able to be accessed using processor instructions. The force sensors 1605 may use any suitable components and may rely on any suitable phenomena to detect physical inputs. For example, the force sensors 1605 may be strain-based sensors, piezoelectric-based sensors, piezoresistive-based sensors, capacitive sensors, resistive sensors, or the like. The force sensors 1605 may include any suitable components for detecting force-based inputs and generating signals or data that are able to be accessed using processor instructions, including electrodes (e.g., electrode layers), physical components (e.g., substrates, spacing layers, structural supports, compressible elements, etc.), processors, circuitry, firmware, and the like. The force sensors 1605 may be used in conjunction with various input mechanisms to detect various types of inputs. For example, the force sensors 1605 may be used to detect presses or other force inputs that satisfy a force threshold (which may represent a more forceful input than is typical for a standard "touch" input). Like the touch sensors 1603, the force sensors 1605 may be integrated with or otherwise configured to detect force inputs applied to any portion of the device 1600. For example, the force sensors 1605 may be configured to detect force inputs applied to any portion of the device 1600 that includes a display (and may be integrated with a display), such as the display 103. The force sensors 1605 may operate in conjunction with the touch sensors 1603 to generate signals or data in response to touch- and/or force-based inputs.

The device 1600 may also include one or more haptic devices 1606. The haptic device 1606 may include one or more of a variety of haptic technologies such as, but not necessarily limited to, rotational haptic devices, linear actuators, piezoelectric devices, vibration elements, and so on. In general, the haptic device 1606 may be configured to provide punctuated and distinct feedback to a user of the device. More particularly, the haptic device 1606 may be adapted to produce a knock or tap sensation and/or a vibration sensation. Such haptic outputs may be provided in response to detection of touch and/or force inputs, and may be imparted to a user through the exterior surface of the device 1600 (e.g., via a glass or other surface that acts as a touch- and/or force-sensitive display or surface). The haptic device 1606 may provide haptic outputs in response to key inputs applied to a virtual (e.g., touchscreen-based) keyboard. A touchscreen-based keyboard may be provided on an upper surface of a base portion of a device (e.g., the base portion 104).

The one or more communication channels 1604 may include one or more wireless interface(s) that are adapted to provide communication between the processing unit(s) 1601 and an external device. The one or more communication channels 1604 may include antennas (e.g., antennas that include or use the housing components as radiating members), communications circuitry, firmware, software, or any other components or systems that facilitate wireless communications with other devices. In general, the one or more communication channels 1604 may be configured to transmit and receive data and/or signals that may be interpreted by instructions executed on the processing units 1601. In some cases, the external device is part of an external communication network that is configured to exchange data with wireless devices. Generally, the wireless interface may communicate via, without limitation, radio frequency, optical, acoustic, and/or magnetic signals and may be configured to operate over a wireless interface or protocol. Example wireless interfaces include radio frequency cellular interfaces (e.g., 2G, 3G, 4G, 4G long-term evolution (LTE), 5G, GSM, CDMA, or the like), fiber optic interfaces, acoustic interfaces, Bluetooth interfaces, infrared interfaces, USB interfaces, Wi-Fi interfaces, TCP/IP interfaces, network communications interfaces, or any conventional communication interfaces. The one or more communications channels 1604 may also include ultra-wideband (UWB) interfaces, which may include any appropriate communications circuitry, instructions, and number and position of suitable UWB antennas.

As shown in FIG. 16, the device 1600 may include a battery 1607 that is used to store and provide power to the other components of the device 1600. The battery 1607 may be a rechargeable power supply that is configured to provide power to the device 1600. The battery 1607 may be coupled to charging systems (e.g., wired and/or wireless charging systems) and/or other circuitry to control the electrical power provided to the battery 1607 and to control the electrical power provided from the battery 1607 to the device 1600.

The device 1600 may also include one or more displays 1608 configured to display graphical outputs. The displays 1608 may use any suitable display technology, including liquid crystal displays (LCD), organic light emitting diodes (OLED), active-matrix organic light-emitting diode displays (AMOLED), or the like. The displays 1608 may display graphical user interfaces, images, icons, or any other suitable graphical outputs. The display 1608 may correspond to the display 103 or other displays described herein.

The device 1600 may also provide audio input functionality via one or more audio input systems 1609. The audio input systems 1609 may include microphones, transducers, or other devices that capture sound for voice calls, video calls, audio recordings, video recordings, voice commands, and the like.

The device 1600 may also provide audio output functionality via one or more audio output systems (e.g., speakers) 1610. The audio output systems 1610 may produce sound from voice calls, video calls, streaming or local audio content, streaming or local video content, or the like.

The device 1600 may also include a positioning system 1611. The positioning system 1611 may be configured to determine the location of the device 1600. For example, the positioning system 1611 may include magnetometers, gyroscopes, accelerometers, optical sensors, cameras, global positioning system (GPS) receivers, inertial positioning systems, or the like. The positioning system 1611 may be used to determine spatial parameters of the device 1600, such as the location of the device 1600 (e.g., geographical coordinates of the device), measurements or estimates of physical movement of the device 1600, an orientation of the device 1600, or the like.

The device 1600 may also include one or more additional sensors 1612 to receive inputs (e.g., from a user or another computer, device, system, network, etc.) or to detect any suitable property or parameter of the device, the environment surrounding the device, people, or things interacting with the device (or nearby the device), or the like. For example, a device may include temperature sensors, biometric sensors (e.g., fingerprint sensors, photoplethysmographs, blood-oxygen sensors, blood sugar sensors, or the like), eye-tracking sensors, retinal scanners, humidity sensors, buttons, switches, lid-closure sensors, or the like.

The device 1600 may also include one or more input devices 1613. An input device 1613 is a device that is configured to receive user input. The input devices 1613 may include, for example, a keyboard (touchscreen based or mechanical), a trackpad or other pointing device, a push button, a touch-activated button, a keypad, or the like. In some embodiments, the input device 1613 may provide a dedicated or primary function, including, for example, a power button, volume buttons, home buttons, scroll wheels, and camera buttons. Generally, a touch sensor (e.g., a touchscreen) or a force sensor may also be classified as an input device. However, for purposes of this illustrative example, touch sensors and force sensors are depicted as distinct components within the device 1600.

To the extent that multiple functionalities, operations, and structures described with reference to FIG. 16 are disclosed as being part of, incorporated into, or performed by the device 1600, it should be understood that various embodiments may omit any or all such described functionalities, operations, and structures. Thus, different embodiments of the device 1600 may have some, none, or all of the various capabilities, apparatuses, physical features, modes, and operating parameters discussed herein. Further, the systems included in the device 1600 are not exclusive, and the device 1600 may include alternative or additional systems, components, modules, programs, instructions, or the like, that may be necessary or useful to perform the functions described herein.

As described above, one aspect of the present technology is the gathering and use of data available from various sources to improve the usefulness and functionality of devices such as mobile phones. The present disclosure contemplates that in some instances, this gathered data may include personal information data that uniquely identifies or can be used to contact or locate a specific person. Such personal information data can include demographic data, location-based data, telephone numbers, email addresses, twitter IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to locate devices, deliver targeted content that is of greater interest to the user, or the like. Further, other uses for personal information data that benefit the user are also contemplated by the present disclosure. For instance, health and fitness data may be used to provide insights into a user's general wellness or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data at a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

As used herein, the phrase "at least one of" preceding a series of items, with the term "and" or "or" to separate any of the items, modifies the list as a whole, rather than each member of the list. The phrase "at least one of" does not require selection of at least one of each item listed; rather, the phrase allows a meaning that includes at a minimum one of any of the items, and/or at a minimum one of any combination of the items, and/or at a minimum one of each of the items. By way of example, the phrases "at least one of A, B, and C" or "at least one of A, B, or C" each refer to only A, only B, or only C; any combination of A, B, and C; and/or one or more of each of A, B, and C. Similarly, it may be appreciated that an order of elements presented for a conjunctive or disjunctive list provided herein should not be construed as limiting the disclosure to only that order provided.

One may appreciate that although many embodiments are disclosed above, that the operations and steps presented with respect to methods and techniques described herein are meant as exemplary and accordingly are not exhaustive. One may further appreciate that alternate step order or fewer or additional operations may be required or desired for particular embodiments.

Although the disclosure above is described in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the some embodiments of the invention, whether or not such embodiments are described and whether or not such features are presented as being a part of a described embodiment. Thus, the breadth and scope of the present invention should not be limited by any of the above-described exemplary embodiments but is instead defined by the claims herein presented.

What is claimed is:

1. A laptop comprising:
a base portion comprising a keyboard; and
a display portion flexibly coupled to the base portion and positionable in an open configuration relative to the base portion and in a closed configuration relative to the base portion, the display portion comprising:
a display stack;
a display cover positioned over the display stack;
a housing defining a bottom surface and a wall extending from the bottom surface, the wall extending at least partially around a periphery of the display cover and the display stack, the wall defining:
an exterior peripheral surface of the housing;
a side interior surface opposite the exterior peripheral surface; and
a front-facing surface extending from the exterior peripheral surface to the side interior surface; and
a trim member comprising a polymer material, the trim member positioned between the display cover and the housing and at least partially surrounding the display stack and the display cover, the polymer material of the trim member bonded directly to the side interior surface of the wall and directly to a portion of the bottom surface of the housing, the trim member defining a protruding portion protruding from the front-facing surface.

2. The laptop of claim 1, wherein the protruding portion is configured to contact the base portion when the display portion is in the closed configuration relative to the base portion.

3. The laptop of claim 1, wherein:
the housing defines a recess along the bottom surface; and
the trim member fills the recess and extends continuously from the recess to the protruding portion.

4. The laptop of claim 3, wherein:
the recess is a first recess;
the housing further defines a second recess along the bottom surface and adjacent to the first recess, the second recess deeper than the first recess; and
the trim member fills the second recess and flows towards the first recess prior to curing.

5. The laptop of claim 1, further comprising a primer layer disposed over the side interior surface and the front-facing surface, the primer layer configured to bond the trim member to the housing.

6. The laptop of claim 1, wherein:
the display stack is coupled to a portion of the bottom surface; and
in response to an input force at the display cover exceeding a threshold force, a peripheral portion of the display cover or the display stack are configured to contact the trim member.

7. The laptop of claim 1, wherein the trim member is a single continuous loop of polymer material at least partially surrounding the display cover.

8. A laptop comprising:
a base portion comprising a top case defining a user interface surface of the base portion; and
a display portion pivotally coupled to the base portion and comprising:
a display housing comprising a wall, the wall defining a side surface of the display portion and a first front-facing surface of the display portion, the display housing defining a cross-member, the cross-member coupled to the wall and defining a recess;
a cover coupled to the display housing and defining a second front-facing surface of the display portion; and
a molded polymer member bonded to the wall and defining a protruding portion protruding from the first front-facing surface and from the second front-facing surface, the molded polymer member filling the recess, thereby mechanically retaining the molded polymer member to the display housing.

9. The laptop of claim 8, wherein the protruding portion is configured to contact the user interface surface of the base portion when the display portion is in a closed configuration relative to the base portion.

10. The laptop of claim 8, wherein:
the display housing defines a plurality of receptacles positioned around a periphery of the display portion;
the display portion further comprises a plurality of magnetic members, each magnetic member of the plurality of magnetic members positioned within a respective receptacle from the plurality of receptacles; and
the molded polymer member at least partially fills the plurality of receptacles, thereby securing the plurality of magnetic members to the display portion.

11. The laptop of claim 10, wherein:
the molded polymer member defines an opening; and
the plurality of magnetic members are partially exposed through the opening.

12. The laptop of claim 10, wherein the molded polymer member covers a top surface of the plurality of magnetic members.

13. The laptop of claim 8, wherein:
the display portion is coupled to the base portion via a hinge positioned along a bottom side of the display housing;
the molded polymer member defines:
a trim portion extending along an interior surface of the wall; and
a barrier portion extending from the trim portion and positioned between the trim portion and the bottom side of the display housing, the barrier portion defining a clearance recess; and
a corner region of the base portion extends into the clearance recess when the display portion is moved between a closed configuration relative to the base portion and an open configuration relative to the base portion.

14. A laptop comprising:
a display portion comprising:
a housing defining:
a peripheral mounting surface; and
a bottom surface adjacent to the peripheral mounting surface;
a display assembly positioned at least partially within the housing and comprising:
a display cover defining a display surface; and
a display component attached to the bottom surface of the housing; and
a trim member bonded to the housing and defining:
a protruding portion extending proud of the display surface;
an interior portion formed along the peripheral mounting surface, the interior portion defining a gap between the display cover and the housing;
a wall segment defining a front-facing camera region of the display assembly; and
a hole extending through the wall segment;
a base portion comprising a keyboard and pivotally coupled to the display portion; and
a camera module configured to receive light through the hole.

15. The laptop of claim 14, further comprising a transparent window positioned in the hole and covering the camera module.

16. The laptop of claim 14, wherein the protruding portion maintains the base portion a set distance away from the display portion when the display portion is in a closed configuration relative to the base portion.

17. The laptop of claim 14 wherein:
a portion of the peripheral mounting surface is depressed with respect to the bottom surface; and
the trim member fills the depressed portion of the peripheral mounting surface.

18. The laptop of claim 14, wherein the housing defines a plurality of injection regions defining a respective cavity that is deeper than the peripheral mounting surface.

19. A laptop comprising:
a base portion comprising a keyboard; and
a display portion flexibly coupled to the base portion and positionable in an open configuration relative to the base portion and in a closed configuration relative to the base portion, the display portion comprising:
a display stack;
a display cover positioned over the display stack;
a housing defining a bottom surface, a recess along the bottom surface, and a wall extending from the bottom surface, the wall extending at least partially around a periphery of the display cover and the display stack, the wall defining:
an exterior peripheral surface of the housing;
a side interior surface opposite the exterior peripheral surface; and
a front-facing surface extending from the exterior peripheral surface to the side interior surface; and
a trim member positioned between the display cover and the housing and at least partially surrounding the display stack and the display cover, the trim member bonded to the side interior surface of the wall and to a portion of the bottom surface of the housing, the trim member defining a protruding portion protruding from the front-facing surface, the trim member filling the recess and extending continuously from the recess to the protruding portion.

20. A laptop comprising:

a base portion comprising a top case defining a user interface surface of the base portion; and a display portion pivotally coupled to the base portion and comprising:

a display housing defining a plurality of receptacles positioned around a periphery of the display portion; and a plurality of magnetic members, each magnetic member of the plurality of magnetic members positioned within a respective receptacle from the plurality of receptacles, the display housing comprising a wall, the wall defining a side surface of the display portion and a first front-facing surface of the display portion;

a cover coupled to the display housing and defining a second front-facing surface of the display portion; and a molded polymer member bonded to the wall and defining a protruding portion protruding from the first front-facing surface and from the second front-facing surface, the molded polymer member at least partially filling the plurality of receptacles, thereby securing the plurality of magnetic members to the display portion.

21. A laptop comprising:

a base portion comprising a top case defining a user interface surface of the base portion; and a display portion pivotally coupled to the base portion via a hinge positioned along a bottom side of the display portion, the display portion comprising:

a display housing comprising a wall, the wall defining a side surface of the display portion and a first front-facing surface of the display portion;

a cover coupled to the display housing and defining a second front-facing surface of the display portion; and a molded polymer member bonded to the wall and defining a protruding portion protruding from the first front-facing surface and from the second front-facing surface, the molded polymer member defining:

a trim portion extending along an interior surface of the wall; and a barrier portion extending from the trim portion and positioned between the trim portion and the bottom side of the display housing, the barrier portion defining a clearance recess, wherein a corner region of the base portion extends into the clearance recess when the display portion is moved between a closed configuration relative to the base portion and an open configuration relative to the base portion.

* * * * *